United States Patent
Chen

(10) Patent No.: US 11,562,070 B2
(45) Date of Patent: Jan. 24, 2023

(54) QUANTUM-ATTACK RESISTANT OPERATING SYSTEM FOR USE IN A KEY MANAGEMENT MECHANISM

(71) Applicant: AhP-Tech Inc., New Taipei (TW)

(72) Inventor: Chao-Huang Chen, New Taipei (TW)

(73) Assignee: AhP-Tech Inc., New Taipei (TW)

(*) Notice: Subject to any disclaimer, the term of this patent is extended or adjusted under 35 U.S.C. 154(b) by 280 days.

(21) Appl. No.: 16/933,987

(22) Filed: Jul. 20, 2020

(65) Prior Publication Data
US 2021/0312047 A1 Oct. 7, 2021

(30) Foreign Application Priority Data
Apr. 1, 2020 (TW) .................. 109111377

(51) Int. Cl.
*G06F 21/56* (2013.01)
*G06N 10/00* (2022.01)
*G06N 7/08* (2006.01)
*G06F 17/16* (2006.01)
*G06N 20/00* (2019.01)

(52) U.S. Cl.
CPC ............ *G06F 21/566* (2013.01); *G06F 17/16* (2013.01); *G06N 7/08* (2013.01); *G06N 10/00* (2019.01); *G06N 20/00* (2019.01); *G06F 2221/034* (2013.01)

(58) Field of Classification Search
CPC .. G06F 21/566; G06F 17/16; G06F 2221/034; G06N 10/00; G06N 20/00; G06N 7/08
See application file for complete search history.

(56) References Cited

U.S. PATENT DOCUMENTS 11,334,667 B1 * 5/2022 Ramanathan ......... H04L 9/0861

* cited by examiner

*Primary Examiner* — Hee K Song

(57) ABSTRACT

A quantum-attack resistant operating system for use in a key management mechanism which is a full solution of cybersecurity for quantum transmission via optical paths, in order to detect and bypass quantum computing attacks, or to perform quantum counterattacks, during various procedures of quantum key managements; wherein the system avoids the attacks of key tampering, destroying, detecting, and blocking, from other quantum systems in a quantum key storage phase; meanwhile, it also avoids the sniffing from other quantum systems on key entangled properties, in a quantum key clearing phase; in addition, in a quantum key recycling phase, facing quantum computing attacks, it not only can disrupt the judgement of other systems on key verification, but also consumes the computing resources on the attacker side; thereby the present invention provides a protection mechanism which cannot be achieved by a conventional PQC (Post-quantum cryptography) solution.

16 Claims, 11 Drawing Sheets

QUANTUM-ATTACK RESISTANT OPERATING SYSTEM FOR USE IN A KEY MANAGEMENT MECHANISM

CROSS-REFERENCE TO RELATED APPLICATION

This non-provisional application claims priority under 35 U.S.C. § 119(a) on Patent Application No(s). 109111377 filed in Taiwan, R.O.C. on Apr. 1, 2020, the entire contents of which are hereby incorporated by reference.

BACKGROUND OF THE INVENTION

1. Field of the Invention

The present invention relates to a key management system for quantum-attack resistance, and in particular, to a quantum computing attack resistant system for use in a key management mechanism, implemented with technologies of quantum key protection (including key storage, key clearing, key recycling, key recovery, disaster migration, and history review), quantum counterattack, attack bypassing, quantum honeypot and high-performance quantum computing, thereby the present invention can provide a system of quantum computing attacking resistance in various key management phases such as quantum key storage, quantum key clearing, quantum key recycling, and so on.

2. Description of the Related Art

At present, the conventional PQC (post-quantum encryption) technology mainly focuses on the key-derivation method of quantum keys and the exchange or distribution process of quantum keys for resisting quantum computing attacks. However, for the entire key management phases, current technology still lacks architecture for comprehensive cyber security in quantum communications; especially in the phases of quantum key storage, quantum key clearing, and quantum key recycling (updating), it is particularly prone to be exposed to vulnerabilities of quantum computing attacks; if there is no complete security mechanisms against quantum computing attacks in the key management phases, the industrial utility of quantum keys will be greatly reduced.

For example, in the quantum key storage phases, quantum computing attacks from other systems may tamper, destroy, detect, or block the quantum key; in the quantum key clearing phases, quantum computing attacks from other systems may peer the key entanglement properties; in the quantum key recycling (updating) phases, quantum computing attacks from other systems may perform man-in-the-middle attacks on key verification processes.

Therefore, it is desirable to have improvements in the approach to PQC solutions for key management phases.

BRIEF SUMMARY OF THE INVENTION

In view of the drawbacks of the prior art, it is an object of the present invention to provide a system with cyber security solutions for use in a key management mechanism to resist quantum computing attacks. By resisting quantum computing attacks in various phases of quantum key management, the utility of quantum keys can be effectively enhanced. This technology can be implemented in electronic devices, systems, or cloud solutions with reasonable costs, and can be used to protect most quantum key management systems. Meanwhile, it effectively avoids the vulnerability of the implementation in quantum key management phases with the current PQC scheme and solves the problem that the legacy cyber security mechanism lacks the ability of performing counterattacks to quantum computing attacks.

To achieve the above objects and more, the present invention provides a device, system, or cloud solution that implements a quantum-attack resistant operating system for use in a key management mechanism. In an embodiment, the present invention comprises: a first sub-system which resists quantum computing attacks of quantum key tampering, destroying, detecting, and blocking, from other systems in phases of quantum key storage; a second sub-system which avoids quantum computing attacks from other systems sniffing on the key entanglement properties in phases of quantum key clearing; and a third sub-system which avoids quantum computing attacks from other systems that perform man-in-the-middle attacks in phases of quantum key recycling. Here the mentioned quantum key recycling comprises phases of related naming known by PHOSITA, such as key recycling, key updating, or key rotating.

Referring to a role of a KDC (key distribution center) with a key management mechanism, key storage is usually a basic function for key management, thus the first sub-system of the present invention mainly corresponds to protect the phases of quantum key storage. However, for security concerns, a KDC may remove a key storage due to expiration or system intrusion issues for preventing further key cracking events, thus the second sub-system of the present invention mainly corresponds to protect the phases of quantum key clearing. In addition, a mature KDC usually has key replacement or rotation policy for a full life cycle of key management which may involve complicated authentication and key verification issues, thus the third sub-system of the present invention mainly corresponds to protect the phases of quantum key recycling. Hence, as a security implementation, the three sub-systems work together in the embodiments of the present invention, and the elements in the three sub-systems are leveraged across different sub-systems (the inter-operation will be illustrated in the following description). Thus, an embodiment according to the above consideration implements the three sub-systems as a cloud cyber security service operating on a server-virtualization platform comprising a plurality of virtual machines and adopts SDN (software definition network) as the network infrastructure for internal communications.

In an embodiment, in order to resist quantum computing attacks during a quantum key storage procedure, the first sub-system at least comprises: a wave-function management module, a system wave-function analysis module, and a shielding & shielding-resistance module. Wherein, the wave-function management module modifies a wave function via making use of the Schrödinger equation with momentum adjustment; the system wave-function analysis module analyzes the wave functions through operations of Born-Oppenheimer approximation, while the wave functions are adopted by quantum behaviors, mechanisms, approaches, or apparatuses of other systems, in a communication environment with an optical path of quantum steering; and the shielding & shielding-resistance module prevents processes and operations related to a quantum key in storage from being detected or blockaded by a quantum computing in a local system.

Referring to an embodiment, combining these elements in an implementation of software, hardware, or a combination of software and hardware into a quantum-key-storage sub-system can effectively prevent the quantum key from being tampered with or being destroyed by other quantum systems in phases of quantum key storage. This integration is progressive over conventional technology.

In an embodiment, in order to promptly estimate a system wave function for an unknown quantum system via making use of the Born-Oppenheimer approximation with matrices operations for a nuclear wave function, the system wave-function analysis module of the first sub-system comprises: a Slater-determinant computing sub-unit, a Pauli-matrices converting sub-unit, a Born-rule computing sub-unit, a Franck-Condon principle analysis sub-unit, and a Born-Oppenheimer approximation computing sub-unit. The Slater-determinant computing sub-unit transforms a plurality of results of wave-function measurements into a form of Slater determinant with bases, via a data pre-processing program and a normalizing process with eigen vectors and eigen values, where the data pre-processing program comprises subroutines of missing data handling, outlier handling, and duplicate-data handling. Thereafter, the Pauli-matrices converting sub-unit performs a pre-processing program and a converting process for converting a Slater determinant into a form of a plurality of Pauli matrices to express a plurality of observations, where the pre-processing program comprises the processes of 1) a Hartree method process with Hartree product to process the Slater determinant, 2) a linear dependence filtering process to discard the linear dependent cases, 3) an order rationality verification process with wedge product operations to discard the cases where the data is arranged in an incorrect sequence on the determinant, 4) a fermion filtering process to discard fermion related cases, 5) a verification process with Hund's rule of maximum multiplicity to discard the cases which follow Hund's rule, 6) a degenerate state filtering process with Hund's rules to discard degenerate cases, 7) a filtering process with the Tolman-Oppenheimer-Volkoff equation via the Schwarzschild metric with the Reissner-Nordström metric, the Kerr metric or the Kerr-Newman metric for filtering micro substances with artificial gravity and strong magnetic fields, 8) a filtering process based on electron degeneracy pressure to discard incorrect artificial cases or real collapsing cases, 9) a filtering process via making use of the Zeeman effect, 10) a non-identical particle filtering process to assure that all the measured particles are identical particles, 11) an incompatible observable filtering process to assure that all the observables are compatible observables, 12) a second-quantization observable filtering process, and 13) an angular-momentum-coupled observable filtering process based on Clebsch-Gordan coefficients.

Thereafter, the Born-rule computing sub-unit receives the observations from the Pauli-matrices converting sub-unit, and derives probability of the transition effect corresponding to each observation through the Born rule. Thereafter, the Franck-Condon principle analysis sub-unit performs a pre-processing program to derive a quantum harmonic oscillator function, and analyzes the derived transition probability with the derived quantum harmonic oscillator function via making use of the Franck-Condon principle of quantum mechanics, so as to derive a distribution of the transition probability and linear combinations of the approximate solutions of a particle wave function and a nuclei wave function while the particle wave function can be ignored when there is a quantum tunneling effect, wherein the pre-processing program comprises the following steps: 1) finding zero-point energy from zero oscillations to derive the ground state of a wave function; 2) performing nondimensionalization for the wave function corresponding to the derived ground state to obtain an approximate solution for the quantum wave function; 3) repeating step 2) to find a plurality of ground states for the available zero oscillations to obtain a plurality of wave functions; 4) coupling the available wave functions as a quantum harmonic oscillator; 5) performing a quasi-particle filtering process to discard quasi-particle related cases; 6) performing a one-dimensional harmonic oscillator filtering process to discard degenerate cases; 7) performing a resolution process for a time-independent Schrödinger equation derived from an eigenstate so as to derive a nuclear wave function; and 8) performing nondimensionalization for the derived nuclear wave function to obtain an approximate solution of the nuclear wave function. Thereafter, the Born-Oppenheimer approximation computing sub-unit performs a pre-processing program and a Born-Oppenheimer approximation process based on the approximate solutions of the particle wave function and the nuclei wave function to obtain an approximate solution of a system wave function, and then performs a post-processing program, wherein the pre-processing program comprises the following subroutines: 1) confirming that the nuclei is much heavier than electrons; 2) making use of the Franck-Condon factor for confirming that numbers derived from the extinction coefficient are in a valid range; 3) performing a phonon filtering process to discard phonon cases; and 4) confirming that the transition dipole surface fits the condition of Condon approximation. The Born-Oppenheimer approximation process comprises the following steps: 1) expressing the system Hamiltonian with a nuclear kinetic energy operator and an electron Hamiltonian; 2) introducing the electron Hamiltonian into an electronic Schrödinger equation for deriving electronic wave functions and a potential energy surface; 3) making use of density functional theory on the electronic Schrödinger equation to obtain the potential energy surface (PES); 4) performing a validation subroutine to confirm that the electronic state is sufficiently separated from other electronic states; 5) performing another validation subroutine with the Born rule for the transition probability derived from the obtained PES; 6) dropping the points near conical intersections on the PES; 7) performing BO approximation on the processed PES to derive an approximate solution of a system wave function; 8) performing a symmetry and asymmetry validation process on the derived harmonic oscillator wave function; and 9) performing a verification process on the derived approximate solution with the angular-momentum accuracy verification module of the third sub-system for confirming that the solution is feasible; and the post-processing program of the Born-Oppenheimer approximation computing sub-unit comprises the following subroutines: 1) monitoring the variation of the wave functions estimated by the above approximations; 2) finding linear combinations of the wave functions through the superposition principle; 3) expressing the wave functions into the form of a Bloch sphere; 4) combining the Bloch-sphere expressions and the linear combination of wave functions as attributes of a quantum system; 5) introducing a time variant term to the Schrödinger equation for predicting a decoherence status; 6) correcting the approximate solution according to the interference caused by the variation of temperature in the quantum system; 7) storing the combined attributes into a database; 8) configuring patterns composed of the attributes stored in the database for cyber firewalls; 9) performing an identification process with the database for identifying the attacker group; 10) configuring patterns composed of the attributes stored in the database as a blocklist/allowlist for quantum communication; 11) performing a quantum interfering process on the attacker side with the wave functions stored in the database; 12) performing a history analyzing process to the database for predicting malicious behaviors from the attacker side; 13) receiving instructions from a honeypot construction module for sharing the database; 14) performing a von-Neumann-entropy analyzing process on the stored approximate solutions for creating additional patterns for a quantum system; 15) performing a second-quantization identification process on the stored approximate solutions functions for identifying a wave function made by a second-quantization operation; 16) performing another identification process on the stored approximate solutions functions for identifying a wave function which cannot be analyzed by a functional analysis process or is operated with an excited-state; 17) performing another identification process on the stored approximate solutions for identifying a slow-varying wave function; 18) performing another identification process on the stored approximate solutions for identifying a fast-varying wave function; 19) creating additional patterns with the combination of results of wave-function measurements; 20) performing a regression process on the results of wave-function measurements; 21) performing a non-linear PCA process on the results of wave-function measurements; 22) performing an analyzing process with Chaos models for the results of wave-function measurements with time-variant features; and 23) performing an A.I. analyzing process on the results of wave-function measurements. Here the pattern mentioned in the present invention means a special combination of derived data which is valuable to be treated as, for example, a feature, characteristic, attribute, or property.

In some embodiments, combining the above five elements in an implementation of software, hardware, or a combination of software and hardware into a system wave-function analyzing unit can quickly provide an idea of an unknown wave function, and efficiently fulfil the system database with valuable patterns. This is an effect that cannot be achieved by conventional technology.

In an embodiment, in order to enhance the measurement ability of quantum computing attacks and suspicious quantum behaviors, and enhance the ability of pattern extraction coupled to the Born-Oppenheimer approximation computing sub-unit of the system wave-function analysis module, meanwhile to promptly resist a quantum computing attack and to provide the ability of history tracing, the system wave-function analysis module of the first sub-system further comprises a set of sub-units. There is a pre-processing program before performing the set of sub-units and there is also a post-processing program after performing the set of sub-units, wherein the pre-processing program discards the measurements with degenerate states, and the post-process program comprises the following subroutines: 1) performing a verification subroutine with the angular-momentum accuracy verification module of the third sub-system to assure that the current measurement is feasible; 2) dropping the computing result derived from an approximation computing process and performing a measurements processing program for pattern extraction without approximation when the computing result cannot successfully pass the above verification process; 3) dropping the computing result and performing a measurements processing program for pattern extraction without approximation when the computing result derived from an approximation cannot tend to convergence; 4) dropping the computing result and performing a measurements processing program for pattern extraction without approximation when a WKB computing failed in an asymptotic expansion; 5) dropping the computing result and performing a measurements processing program for pattern extraction without approximation when a WKB computing processes a ground state of a many-particle system; and 6) tagging a malicious label on the measurements which cannot be analyzed or post-processed by the system wave-function analysis module. The set of sub-units working with the above pre-process program and the post-process program comprises: 1) a second-quantization measurement sub-unit for measuring a harmonic-oscillator attack launched through a second quantization; 2) a GWA (GW approximation) computing sub-unit with the ability of GWA and perturbation computing for measuring excited-state attacks, or a quantum attack on which functional analysis cannot be performed; 3) a WKB approximation computing sub-unit for measuring quantum attacks of slow-varying wave function; and 4) a calculus-of-variations computing sub-unit which performs a calculus-of-variations computing process for measuring quantum attacks of fast-varying wave function via using calculus of variations of functional analysis. The calculus-of-variations computing process comprises the following subroutines: 1) confirming whether there is an extremum to the measurement; 2) confirming that the data of measurements can be expressed as a curve with a set of equations; 3) confirming that the expressed curve is continuously differentiable; 4) confirming that the dimension of the measurements is reasonable; 5) finding the critical points in the domain of the expressed curve so as to determine the boundary for the calculus operations; and 6) performing Calculus-of-Variations computing operations on the expressed curve. In some embodiments, combining the above four elements in an implementation of software, hardware, or a combination of software and hardware into a quantum system measurement unit not only can cover to perform effective measurements on the wave functions caused by various quantum computing attacks, but also enhances the system database with more advanced patterns. This is an effect that cannot be achieved by conventional technology.

In an embodiment, for the cases requiring the Born-Oppenheimer approximation, in order to express an initial equilibrium state with bases derived from a plurality of wave-function measurements for use in a Born-Oppenheimer approximation computing process in the condition of zero-point energy, so as to facilitate the operations of the Born-Oppenheimer approximation, thereby performing pattern-extraction from the derived initial equilibrium states for analyzing whether there is a common source for the measured wave functions, the Born-Oppenheimer approximation computing sub-unit of the system wave-function analysis module of the first sub-system further comprises: a projection operation sub-module, a Fock-space switching sub-module, a Hilbert-space switching sub-module, a second-quantization sub-module, a plurality of Fourier-transform sub-modules, a functional analysis sub-module, a standardization operation sub-module, a sample-mean computing sub-module, and a Schrödinger-equation transformation sub-module.

In an embodiment, the projection operation sub-module estimates a linear combination of qubits for a measured quantum system via making use of projection operators. Moreover, the Fock-space switching sub-module performs a Fock-space switching process to express a linear combination of qubits as a quantum system state via making use of a singular-integral operator of a Fock space. The Fock-space switching process comprises the following subroutines: 1) normalizing the linear combination of qubits; 2) finding the bases represented to various Hilbert spaces; 3) expressing the linear combination of bases in a form of Fock space; 4) performing Fock-space operations via making use of norm, tensor product, inner product, direct sum, and complex scalar to obtain Fock states; 5) performing a filter to drop the linear combination if there is a Fock state represented to a combination of fermions and bosons; and 6) performing a singular-integral operation on the Fock space to obtain states of a quantum system. Thereafter, the Hilbert-space switching sub-module performs a pre-processing program and a Hilbert-space switching process to switch quantum system state of a Fock space into a form of multi-dimensional Hilbert space. The pre-processing program comprises the following steps: 1) selecting the corresponding orthogonal bases in a Hilbert space according to the quantum system state of a Fock space; 2) performing projection operations with a projection operator and the orthogonal bases for the quantum system state; 3) performing unitary transformation on the projected quantum system state; 4) deriving wave functions according to the corresponding bases from the transformed quantum system state; 5) performing eigenization on the derived wave functions to derive eigen value and eigen vectors. The Hilbert-space switching process comprises the following steps: 1) converting the eigenized result derived from the pre-processing program into a complex Hilbert space to express the eigenstate with a plane-wave term and a bound-state term; 2) handling to extract the bound states from the complex Hilbert space; 3) simulating the bound state with a combination of harmonic oscillators to derive corresponding harmonic wave functions according to the bound states; 4) handling the harmonic wave function with spectral method to derive an energy-level equation that helps to obtain the corresponding energy spectrum of a harmonic wave function; 5) adopting a Hilbert-Schmidt operator as an identity operator to perform dimension verification for the harmonic wave functions to confirm whether the above transformation is successful; and 6) performing inner-product operations on the harmonic wave functions for discarding the wave functions of a local system to assure that the current quantum system states are from other systems. In addition, the second-quantization sub-module performs a second-quantization process on a quantum system state of Hilbert space via making use of creation and annihilation operators, and the result of the second-quantization process is for describing the Hamiltonian of the quantum system. The Born-Oppenheimer approximation computing sub-unit comprises a plurality of Fourier-transform sub-modules that each performs Fourier transforms on a Hamiltonian of a quantum system to eliminate the uncertainty of the physical quantity of position and the uncertainty of the physical quantity of momentum, and then performs a verification with Parseval's theorem to confirm the transformed result is correct, and thereby obtains two kinds of transformed system physical quantities. Moreover, the functional analysis sub-module which performs functional analysis on the determined transformed system physical quantities, to obtain a probability distribution via making use of a calculus-of-variations method, and to derive energy states via making use of the Bessel function, thereby to extract more features of a wave function. Thereafter, the standardization operation sub-module performs a standardization operation on a probability distribution. Thereafter, the sample-mean computing sub-module estimates a sample mean and a set of moments with various moment ordinal, based on a standardized probability distribution in a sample space, in addition, the sub-module also provides linear combinations of various estimated values of a plurality of particles, meanwhile analyzes the sum of probability in a sample space and performs a Markov process to verify whether a linear combination of the probability distribution is continuous and random. Thereafter, the Schrödinger-equation transformation sub-module expresses the quantum system state as a time-dependent Schrodinger equation based on the estimated sample mean, moments, standardized probability distribution, and the determined converted system physical measurements, so as to derive the initial equilibrium state required for a Born-Oppenheimer approximation.

In some embodiments, combining the above nine elements in an implementation of software, hardware, or a combination of software and hardware into a Born-Oppenheimer approximation computing sub-unit not only facilitates the operations of the Born-Oppenheimer approximation, but also supports to perform pattern-extraction speedily from the derived initial equilibrium states for analyzing whether there is a common source for the measured wave functions. This is an effect that cannot be achieved by conventional technology.

Further, in an embodiment, the above-mentioned first sub-system will determine whether there is an abnormal quantum-system wave function in the quantum communication environment according to the analyzed result derived from the system wave-function analysis module, so as to determine whether a shielding & shielding-resistance mechanism needs performing, and works with the wave-function management module to prevent processes and operations related to a quantum key in storage from being detected or blockaded by quantum computing attacks from other systems. The above-mentioned shielding & shielding-resistance module comprises: an angular momentum coupling unit, a spin-orbit coupling unit, a heavy-atom effect activation unit, a coupling constant derivation unit, and a scale of kinetic energy mapping unit. The above-mentioned angular momentum coupling unit performs a pre-process for spin-pairing and a process for angular momentum coupling to obtain required spin angular momentum that is the same as the spin angular momentum of other systems. Thereafter, the spin-orbit coupling unit performs a j-j coupling process to couple an orbit and the spin angular momentum. Thereafter, the heavy-atom effect activation unit triggers a transition effect through enhancing the coupling effect of spin-orbit. Moreover, the coupling constant derivation unit derives a coupling constant via calculating the incidence rate of the transition effect. Finally, the scale of kinetic energy mapping unit creates mapping data of the coupling constant and the scale of kinetic energy according to the relations between the coupling constant and the scale of kinetic energy.

In a quantum communication environment with optical paths, a shielding attack from other quantum system may make an end user fail to get a quantum key through a remote access. In an embodiment, the above-mentioned angular momentum coupling unit, spin-orbit coupling unit, and the heavy-atom effect activation unit can work together for performing a shielding-resistance mechanism via making use of the transition effect, so as to prevent the quantum key from being blockaded by a shielding attack from other quantum systems. Moreover, the above-mentioned coupling constant derivation unit and the scale of kinetic energy mapping unit can work together for performing a shielding mechanism coupled to the wave-function management module via providing a required angular momentum parameter derived from the mapping data of the coupling constant and the scale of kinetic energy, so as to adjust the wave function of a quantum channel to prevent the quantum state of a quantum key in storage from being detected by the attacked side through the quantum communication channel. Thus, combining the above five elements in an implementation of software, hardware, or a combination of software and hardware into a shielding & shielding-resistance module provides an effect that cannot be achieved by conventional technology.

In an embodiment, the system comprises at least a second sub-system, and the second sub-system resists quantum computing attacks during a procedure of quantum key clearing; in order to adjust the refractive index of an optical path based on a kinetic-energy term, wherein the second sub-system at least comprises: a Euler-Lagrange variation module, a fundamental-unit analysis module, and a Hamiltonian system transformation module. The Euler-Lagrange variation module performs calculus of variations for time and optical path, and then derives a stationary value of least action through the Euler-Lagrange first equation with functional analysis. Thereafter, the fundamental-unit analysis module converts the least action to a description related to momentum through fundamental units. Thereafter, the Hamiltonian system transformation module converts the description related to momentum to a generalized momentum in a Symplectic manifold and derives a kinetic-energy term through the quadratic form of the generalized momentum.

In an embodiment, in order to implement the management ability to refractive index of an optical path via breaking the conservation of angular momentum based on the kinetic-energy term derived from the Hamiltonian system transformation module of the second sub-system, so as to bypass quantum computing attacks and suspicious quantum behaviors, to prevent detection via quantum teleportation, and to perform fake responses through quantum transmission within optical paths. The second sub-system further comprises: a Noether's theorem transformation module, a Hartree-Fock-equation computing module, an angular frequency management module, a phase management module, and an adjustable grating module. Wherein, the Hartree-Fock-equation computing module performs a Hartree-Fock-equation computing process to calculate the minimum required kinetic energy for breaking conservation via making use of the Hartree-Fock equation. The Hartree-Fock-equation computing process comprises the following steps: 1) expressing a conserved quantity of angular momentum with a Slater determinant; 2) performing central force field approximation on the Slater determinant to obtain a molecular orbital wave function; 3) performing calculus of variations on the molecular orbital wave function to obtain a one-electron orbital wave function; 4) resolving the one-electron orbital wave function to obtain a solution; and 5) extracting the minimum required kinetic energy from the obtained solution. Thereafter, the angular frequency management module manages to tune the angular frequency based on the minimum required kinetic energy. Thereafter, the phase management module manages to tune the phase based on the minimum required kinetic energy. Finally, the adjustable grating module performs a pre-processing program and then introduces the light wave that has completed the angular-frequency tuning process and the phase tuning process into a grating element implemented with electro-optic crystals, so as to derive the desired change in refractive index due to breaking the conservation of angular momentum. The pre-processing program coupled to a Bragg grating comprises the following subroutines: 1) analyzing the received wave packets to determine whether there is dispersion issue; 2) determining whether there is diffraction issue; 3) determining whether there is scattering issue; 4) eliminating electromagnetic interference; 5) confirming the resolution for the Bragg grating; 6) confirming the refractive index for the Bragg grating; and 7) introducing the light wave through the Bragg grating to the grating element implemented with electro-optic crystals.

In some embodiments, since the attacker side may perform analysis on the variation of physical quantity caused by a quantum key clearing phase to derive the spin property for key generating process, combining the above eight elements in an implementation of software, hardware, or a combination of software and hardware into a second sub-system effectively prevents the variation of the physical quantity from being measured by the attacker side in the phases of quantum key clearing, through temporarily adjusting the refractive index of the optical path for quantum communication. This is an effect that cannot be achieved by conventional technology.

In an embodiment, the system comprises a plurality of third sub-systems, and the third sub-system resists quantum computing attacks during a quantum key recycling procedure, wherein the third sub-system comprises a plurality of the following modules: a honeypot construction module and a perturbation inducing module. In some embodiments, a plurality of third sub-systems are implemented with a plurality of honeypot servers. The honeypot construction module constructs a specific honeypot to prevent the system from being attacked by other quantum operations during a quantum key recycling procedure. The honeypot construction module comprises: 1) a multi-microwaves generator unit which can operate with photons to activate various transition effects through a plurality of microwave generators with different resonance frequencies; 2) a potential-well control unit which controls energy-level shift via scattering processes and perturbation processes, so as to control the range of the transition effect probability; 3) an angular-frequency combination unit which applies Fermi's golden rule on the transition effect of a discrete energy level for deriving a density of state based on required angular frequency, and then uses a plurality of Born approximation processes based on scattering theory to derive corresponding scattering cross-sections and incident angles, so as to combine a plurality of angular frequencies as a spin attribute; 4) a probability-of-excited-state analysis unit which analyzes the probability of an excited state according to the photoelectric effects measured from a high energy level to a low energy level for determining whether a potential well needs tuning; and 5) a single-frequency harmonic analysis unit which expresses the prepared angular frequency as a single-frequency harmonic, and compares the harmonic with the measured distribution of transition probability to determine whether the prepared angular frequency is applicable. Thus, combining the above five elements in an implementation of software, hardware, or a combination of software and hardware into a honeypot construction module derives required patterns of transition effects and required patterns of angular frequencies timely and flexibly, so as to observe various suspicious or malicious quantum behaviors. This is an effect that cannot be achieved by conventional technology.

In addition, in an embodiment, the perturbation inducing module performs a perturbation inducing process based on the result with various bases derived from the honeypot construction module, so as to bypass or remove quantum computing attacks during the quantum key recycling procedures. The perturbation inducing module comprises: 1) a Bloch-sphere monitoring unit for monitoring quantum operation behaviors caused by non-native systems; 2) an angular-momentum combination unit which combines different angular frequencies via making use of the honeypot construction module as a required angular momentum according to the monitored result derived by the Bloch-sphere monitoring unit; and 3) a harmonic generator unit which generates a harmonic corresponding to the required angular momentum, wherein the harmonic generator unit induces artificial atoms to shift via a perturbation process, so as to bypass or remove the quantum computing attacks from other systems. Thus, combining the above three elements in an implementation of software, hardware, or a combination of software and hardware into a perturbation inducing module can bypass or remove quantum peering behaviors timely and flexibly, so as to prevent the real information of a quantum key from being detected by the attacker side. This is an effect that cannot be achieved by conventional technology.

In an embodiment, in order to implement the ability of disrupting other quantum systems, the third sub-system for resisting quantum computing attacks further comprises: a spin-property verification module, a quantum-computing-attack detection module, an angular-momentum accuracy verification module, and a plurality of anyon control modules. The spin-property verification module derives topology attributes, momentum attributes, and polarization attributes of the spin property for a quantum via an eigenization process, so as to analyze whether a quantum owns a specific spin property. Thereafter, the quantum-computing-attack detection module analyzes a deformed quantum computing attack to derive common bases and variation intervals for working with the spin-property verification module so as to further lock on malicious quantum behaviors. Thereafter, the angular-momentum accuracy verification module provides a verification computing process with perturbation theory, wherein the process is based on an angular momentum estimated by a sub-system to be compared with an angular momentum from other system, for at least one of the first sub-system, the second sub-system, and the third sub-system. In addition, a plurality of anyon control modules is configured to control and adjustment angular momentum to change spin orbit repeatedly to generate various wave functions via making use of an anyon two-dimensional model, so as to disrupt quantum operations from other systems.

In an embodiment, the above-mentioned spin-property verification module comprises: a projection quantum number analysis unit, a Pauli-vector analysis unit, a harmonic-oscillator analysis unit, and an optical path analysis unit. The projection quantum number analysis unit obtains the spin projection quantum number of multiplicity via an analysis process, wherein the analysis process comprises the following subroutines: 1) performing projection measurement of spin along an arbitrary axis; 2) verifying the compatibility of spin measurements; 3) performing a verification based on spin-statistics theorem to confirm the rationality of related spin quantum numbers; 4) calculating the related spin quantum numbers of a quantum system; 5) performing a classification method based on the spin quantum numbers; and 6) performing a plurality of measurements for verifying the rationality of the probability distribution. Thereafter, the Pauli-vector analysis unit performs an analysis process for obtaining a complex plane coordinate to be a topological invariant as a quantum spin property via making use of the Pauli vector and Euler's formula, based on the spin projection quantum number of multiplicity. The analysis process comprises the following steps: 1) performing a verification of symmetry on the spin quantum numbers for discarding the spin quantum numbers with a specific combination of symmetry and asymmetry; 2) performing complex analysis on the projection measurements and discarding the measurements which cannot satisfy Euler's identity; 3) performing complex analysis to express a corresponding Euler's formula as a cis function; 4) extracting the combination of parities (odds and evens) from a Pauli vector corresponding to the spin charges so as to form an attribute or feature for a quantum system; and 5) combining the results of the above steps as a kind of topological invariant as a quantum spin property. Thereafter, the harmonic-oscillator analysis unit performs an analysis process on a quantum harmonic oscillator derived from the system wave-function analysis module of the first sub-system for obtaining a momentum feature as a quantum spin property via analyzing the linear combination of angular frequencies and the linear combination of phases. The analysis process comprises the following subroutines: 1) calculating the minimum potential energy of the harmonic oscillator for determining the available boundaries for this analysis process; 2) performing second quantization on the harmonic oscillator to obtain a combination of creation operators and annihilation operators through ways corresponding for fermions, bosons, or mixed ones, thereby the combination is treated as an angular momentum feature; 3) performing a spectral analysis to find the ground state of the harmonic oscillator for determining whether the oscillator is in an applicable range; 4) performing an analysis on the oscillator with the Laplace transform to confirm the condition of convergence first and then converting the harmonic oscillator to a combination of angular frequencies and a combination of phases; 5) discarding the linear combination of angular frequencies which are perpendicular to each other; and 6) discarding a linear combination when the derived system energy is lower than the minimum potential energy of the oscillator. Finally, the optical path analysis unit performs an optical-path analysis process for obtaining a polarization feature as a quantum spin property via analyzing the combination of the refractive index and the scattering angles within an optical path. The optical-path analysis process comprises the following steps: 1) expressing the combination of the refractive index and the scattering angles on a complex plane; 2) converting the expression of the complex plane to a wave equation; 3) expressing the wave equation on the coordinate system of an electric field and a magnetic field; and 4) analyzing the directions of the electric field and the magnetic field so as to make the combination of the directions as a polarization feature. Thus, combining the above four elements in an implementation of software, hardware, or a combination of software and hardware into a spin-property verification module is capable of obtaining the quantum spin property with combinations of topological features, momentum features, and polarization features, so that the system is able to lock on a combination of the features of the quantum spin property as a pattern of a quantum system, and further to verify whether there is such a pattern in a quantum communication environment and if an alert should be triggered. This is an effect that cannot be achieved by conventional technology.

In an embodiment, in order to observe suspicious quantum behaviors through a total angular momentum operator $J^2$, an orbital angular momentum operator $L^2$, and a spin angular momentum operator $S^2$ The above-mentioned quantum-computing-attack detection module of the third sub-system comprises: an angular-momentum complementary-observable measurement unit, an incompatible-observable verification unit, and an abnormal-variation detection unit. The angular-momentum complementary-observable measurement unit performs a complementary-observable measurement process to measure the variation interval of the common eigenvalue of the Hamiltonian operator and the angular-momentum operator via making use of the commutation relations between the Hamiltonian operator and the angular-momentum operator, to derive the corresponding simultaneous eigenstate. The complementary-observable measurement process comprises the following steps: 1) finding the bases from the measured interval; 2) deriving a Clebsch-Gordan coefficient from the bases via making use of each spin quantum number; 3) repeating the above step for each spin quantum number such as j, l, s, and so on, to obtain a set of Clebsch-Gordan coefficients; 4) making the obtained Clebsch-Gordan coefficients as a C-G table and discarding unreasonable combinations; 5) finding the variation interval based on the derived Clebsch-Gordan coefficients according to the C-G table; 6) comparing the variation interval obtained from the C-G table with the measured variation interval for confirming the measured interval is applicable; 7) deriving the distribution of transition probability according to the measurements; and 8) making use of the derived distribution of transition probability and the derived C-G coefficients to determine whether the measurements are caused by L-L coupling for confirming whether the derived bases are applicable for a common eigenstate. Thereafter, the incompatible-observable verification unit performs an incompatible-observable verification process to measure the Hamiltonian of a first quantum, and then to measure the angular momentum of a second quantum, thereby if the product of the uncertainty for the observables of the first quantum and the second quantum cannot determine that the first quantum and the second quantum are incompatible observables with each other, that will determine that there is common basis between the quantum states of the first quantum and the second quantum. The incompatible-observable verification process comprises the following steps: 1) confirming the two observables are complementary; 2) deriving the eigenstate of the two observables; 3) deriving the eigen value of the two observables; 4) confirming whether the product of the uncertainty for the observables of the first quantum and the second quantum cannot determine that the first quantum and the second quantum are incompatible observables with each other for extracting the common bases from the eigen state; 5) analyzing the common bases to determine whether there is degenerating issue; 6) performing a C.S.C.O. (complete set of commuting observables) operation to fix the degenerating issue if possible; 7) discarding the bases when the C.S.C.O. operation cannot fix the degenerating issue and there is no Hermitian operator for the bases; and 8) also confirming whether the common bases are corresponding to the bases of local quantum system to determine if there is any insider quantum attack. In addition, the abnormal-variation detection unit is in cooperation with other components to be capable of alerting abnormal quantum behaviors to the system, through monitoring system variations in a quantum communication environment. Once the abnormal-variation detection unit reports the abnormal variation detected in the quantum system of a communication environment to the third sub-system, the third sub-system works with the angular-momentum complementary-observable measurement unit and the incompatible-observable verification unit to determine whether there is suspicious quantum behavior. Combining the above three elements in an implementation of software, hardware, or a combination of software and hardware into a quantum-computing-attack detection module is capable of determining whether there is a deformed quantum attack with a common basis the same as a specific quantum state, through analyzing and observing physical quantity and angular momentum of a quantum system, so that a blocklist mechanism for quantum cyber security can be practiced. This is an effect that cannot be achieved by conventional technology.

In addition, in an embodiment, in order to perform a counterattack according to an abnormal signal, to bypass an attack according to an abnormal signal, to block an attack according to an abnormal signal, to collect data of attacks with honeypots, to perform quantum key clearing or quantum key recycling for an abnormal event, to verify a result of quantum key storage for an abnormal event, or to perform a service migration for an abnormal event, the abnormal-variation detection unit of the quantum-computing-attack detection module comprises: an abnormal-decoherence detection sub-unit, a wave-function-collapse detection sub-unit, an abnormal-transition-effect detection sub-unit, an abnormal-variable detection sub-unit, and an abnormal-entropy-variation detection sub-unit. Wherein, the abnormal-decoherence detection sub-unit determines whether the sub-unit should report an abnormal signal to the third sub-system according to the rate of decoherence detected in the quantum communication environment. Further, the wave-function-collapse detection sub-unit is coupled to a set of components for monitoring wave functions in a quantum communication environment, and reports an abnormal signal to the third sub-system when it detects the phenomenon of wave-function collapse. The set of components comprises: 1) the system wave-function analysis module of the first sub-system; 2) the fundamental-unit analysis module of the second sub-system; 3) the probability-of-excited-state analysis unit of the third sub-system; 4) the Pauli-vector analysis unit of the third sub-system; 5) the harmonic-oscillator analysis unit of the third sub-system; 6) the degenerate energy level analysis sub-unit of the third sub-system; and 7) the Lamb-shift testing sub-unit of the third sub-system. Moreover, the abnormal-transition-effect detection sub-unit compares the distribution of transition-effect probability detected in the quantum communication environment with the distribution of transition-effect probability estimated through the detected wave functions, and determines whether the sub-unit should report an abnormal signal to the third sub-system according to the comparison bias. Moreover, the abnormal-variable detection sub-unit introduces an analyzing process of the Einstein-Podolsky-Rosen paradox, and reports an abnormal signal to the third sub-system when detecting a quantum physical behavior consisting with local realism and uncertainty principle simultaneously. The analyzing process comprises the following steps: 1) introducing a Bell measurement to find a case which fails the Bell measurement; 2) confirming the distribution of transition probability is reasonable for the case that failed the Bell measurement; 3) discarding the case if it fits the Aharonov-Bohm effect; 4) discarding the case if it fits the Bohm diffusion; and 5) reporting an abnormal signal to the third sub-system if there is still a case after the above steps. Moreover, the abnormal-entropy-variation detection sub-unit performs a variation analyzing process to determine whether the sub-unit should report an abnormal signal to the third sub-system according to the variation of entropy detected in a quantum system connected to a communication environment. The variation analyzing process supports kinds of entropy as follows: von Neumann entropy, Shannon entropy, equilibrium entropy, and maximum entropy. In addition, the variation analyzing process further comprises the following steps: 1) making use of Boltzmann's entropy formula with transition probability, entropy, and the Boltzmann constant for estimating the variation of entropy; 2) discarding the case if the variation of entropy fits the principle of the increase of entropy; 3) performing a verification with Holevo's theorem for confirming the analyzed variation is out of Holevo's bound; and 4) introducing Lindblad's theorem for confirming that the analyzed variation is not caused by a non-equilibrium so that this sub-unit should report an abnormal signal to the third sub-system. Combining the above five elements in an implementation of software, hardware, or a combination of software and hardware into an abnormal-variation detection unit is capable of alerting abnormal quantum behaviors to the system, through monitoring system variations in a quantum communication environment. Since the abnormal-variation detection unit is further adopted by each sub-system, it enhances a key management mechanism as a complete alerting scheme in various key management phases. This is an effect that cannot be achieved by conventional technology.

In an embodiment, in order to avoid false-positive detections and false-negative detections, and to assure an effect of bypassing a quantum computing attack, and to identify normal and abnormal wave-function collapses, and to detect a local decay caused by external interferences, and to assure the accuracy of detection to transition probability, and to assure the accuracy for the subroutines in a Noether-theorem-transform process, the above-mentioned angular-momentum accuracy verification module of the third sub-system comprises: a non-perturbed wave-function computing unit and an energy-shift verification unit. The non-perturbed wave-function computing unit performs a non-perturbed wave-function computing process to make use of the common eigen function of non-perturbed Hamiltonian, square of a total angular momentum operator $J^2$, square of an orbital angular momentum operator $L^2$, and square of a spin angular momentum operator $S^2$ as a non-perturbed wave function to derive a first-order energy level shift. The non-perturbed wave-function computing process comprises the following steps: 1) deriving the expectation value of L and S; 2) deriving the energy level shift expression from the expectation value; 3) deriving the non-perturbed energy level shift based on the energy level shift expression; 4) deriving each energy level shift based on the energy level shift expression; 5) deriving the wave functions corresponding to each energy shift; 6) introducing Thomas precession to the wave functions for correction to the spin-orbit interaction; 7) performing a verification with a first-order Stark effect for confirming the corrected result is feasible; and 8) confirming that there is no degenerate state and no mass interferences with the corrected wave functions so as to extract the final first-order energy shift. Thereafter, the energy-shift verification unit performs an energy-shift verification process to compare the derived first-order energy level shift with the measured energy level bias to determine whether the accuracy of an estimated angular momentum is applicable. The energy-shift verification process comprises the following steps: 1) confirming the energy level shift is cause by the Stark effect or by Lamb shift; 2) deriving the angular frequency based on the measured energy level shift which is caused by the Stark effect; 3) deriving the angular momentum based on the angular frequency; 4) expressing the first-order energy level shift as a physical quantity through a Hamiltonian operator; 5) expressing the angular momentum with an observable operator; 6) performing a verification with an Hermitian operator on the physical quantity; 7) calculating the bias between the physical quantity and the observable; and 8) tagging the result for further verifications when the derived bias is not acceptable.

Referring to an embodiment, combining the above two elements in an implementation of software, hardware, or a combination of software and hardware into an angular-momentum accuracy verification module is capable of improving the accuracy of angular momentum estimation through implementing the perturbation theory. It not only assures that an angular momentum is qualified enough to be used as an important intrinsic property of the system according to embodiments of the present invention, but also enhances the accuracy of angular momentum synthesis for the perturbation inducing module of the third sub-system. Moreover, it also enhances the accuracy of the derived conservation of the angular momentum when performing a Noether-theorem-transform process through the second sub-system according to the embodiments of the present invention. In addition to accuracy concerns, this verification module also facilitates a perturbation inducing process of the perturbation inducing module to perform a correction term of first energy level and second energy level for a perturbation to a wave function, so as to assure that the energy level shift derived by a perturbation inducing process is qualified. Besides, the most important thing is that a non-qualified bias caused by an estimation of angular momentum may impact the determined result derived from the above-mentioned spin-property verification module, hence this module plays a key role for maintaining an alerting scheme of the entire system. These are effects that cannot be achieved by conventional technology.

In some embodiments, in order to reduce the verification bias so as to enhance the management ability to the refractive index of an optical path and to be able to identify whether there is a quantum tunneling effect. The above-mentioned energy-shift verification unit of the angular-momentum accuracy verification module further comprises: a degenerate energy level analysis sub-unit, a mass-interference analysis sub-unit, and a Lamb-shift testing sub-unit. Wherein, the degenerate energy level analysis sub-unit performs an analysis process to determine whether the current energy level shift fits a degenerate state via analyzing the states of spin quantum numbers. The analysis process comprises the following steps: 1) analyzing the energy level shift to obtain the quantum number of total angular momentum J; 2) obtaining measurements of $J^2$; 3) analyzing the energy level shift to obtain the spin magnetic quantum number $m_s$; 4) performing Bose-Einstein (B-E) statistics for discarding bosons; and 5) performing a verification on the obtained quantum numbers with the Pauli exclusion principle for determining whether there is degenerate state with the energy shift. Thereafter, the mass-interference analysis sub-unit analyzes mass resolution to determine whether there is mass interference with the current energy level shift. Finally, the Lamb-shift testing sub-unit adopts a testing process with the Lamb-shift calculation to analyze the energy level shift when the measured result of an energy level shift fits the condition of a degenerate state or a mass interference, in addition, this sub-unit is optionally applied for the measurement of Hawking radiation and quantum fluctuation, or for the identification of a quantum tunneling effect. The testing process comprises the following subroutines: 1) confirming that the splitting of the spectral lines corresponding to the energy level shift fits a fine structure; 2) introducing the kinetic energy relativistic correction term and the spin-orbit coupling correction term for correcting the non-perturbed Hamiltonian; 3) introducing the fine-structure constant $\alpha$; 4) performing harmonic oscillator quantization for the electric field and the magnetic field; 5) obtaining the zero-point energy from zero oscillation; 6) converting the zero-point energy to the form of a Lamb shift; 7) measuring the Lamb shift via making use of the Zeeman effect; 8) analyzing whether the measurement fits the normal Zeeman effect for confirming whether there is a degenerate state with the energy level shift; and 9) analyzing whether the measurement fits an anomalous Zeeman effect via making use of total angular momentum J, orbital angular momentum L, spin angular momentum S, and the Landé g-factor, for confirming whether there is a decay caused by mass interference with the energy level shift. Combining the above three elements in an implementation of software, hardware, or a combination of software and hardware into an energy-shift verification unit is capable of maintaining the accuracy of angular momentum estimation even when the energy level shift is under the impact of degenerate states or mass interference. This is an effect that cannot be achieved by conventional technology.

In some embodiments, in order to enhance the ability of a counterattack to the quantum computing attacks, the third sub-system further comprises: a replay-attack response module, a quantum random number generator module, a preimage attacking module, a second-preimage attacking module, and a collision attacking module. Wherein, the replay-attack response module performs a replay-attack-response process for responding to a replay attack launched by an attacker side, wherein the replay-attack-response process comprises the following subroutines: 1) replying to the attacker side with forgery data; 2) adjusting the optical paths; 3) working with the perturbation inducing module for bypassing the attack; 4) working with the honeypot construction module for collecting data of attacks; 5) working with a second sub-system to perform quantum key clearing; and 6) requesting the third sub-system to perform quantum key recycling. In addition, the quantum random number generator module derives a forgery hash value or a message digest. Moreover, the preimage attacking module adopts a forgery hash value with true message digest to launch a preimage attack against the attacker side; and the second-preimage attacking module hides the true hash function and modifies the length of a true message digest to launch a second-preimage attack against the attacker side. As for the collision attacking module, it performs a collision-attacking process to make use of the inverse function of the true hash function as the hash function, and the inverse element of the true message digest as the message digest, so as to launch a multi-collision attack against the attacker side. The collision-attacking process comprises the following subroutines: 1) coupling the honeypot construction module for performing collision attacks; 2) driving collisions for cracking the wave functions, quantum keys, or hash functions, of other quantum systems; 3) capturing the common message digests between each other; 4) creating a rainbow table via making use of the hash functions collected from other quantum systems; 5) storing the quantum keys collected from other quantum systems into a database of patterns; 6) storing the wave functions collected from other quantum systems into a database of patterns; 7) making use of no-cloning theorem to extract the linear patterns of the quantum states collected from other quantum systems; and 8) searching for the mothership of an attacker group according to the collected linear patterns. Combining the above five elements in an implementation of software, hardware, or a combination of software and hardware into the third sub-system helps to perform an effective counterattack mechanism against the attacker side when the attacker is trying to intercept the messages exchanged in the phases of quantum key storing, clearing, and recycling. Such combination further avoids cracking analysis from other quantum systems to the handshaking phases as well. In some embodiments, each subsystem adopts various combinations of these elements as different treatments to strike back in different phases of the key management mechanism. These are effects that cannot be achieved by conventional technology.

Finally, in an embodiment, in order to work with the wave-function management module and the system wave-function analysis module of the first sub-system and the spin-property verification module, so as to enhance the ability of counterattack to the quantum computing attacks, the third sub-system performs an attacking pre-processing program and further comprises a set of modules. The attacking pre-processing program comprises the following subroutines: 1) generating required quantum states; 2) making use of a quantum Zeno effect to keep the generated quantum states from decohering; 3) discarding the entangled quantum states; 4) discarding the quantum states of the local quantum system; 5) preventing from reusing the same quantum state in a specified time interval; 6) discarding the quantum states with wrong dimensions; and 7) discarding the quantum states generated with bases of other quantum systems. Further, the set of modules comprises: a forgery-key attacking module, a forgery-quantum-state attacking module, and a quantum DoS attacking module. Wherein, the forgery-key attacking module delivers a forgery public key to the attacker side. Moreover, the forgery-quantum-state attacking module is coupled to a set of components for producing a large number of forgery quantum states via making use of incorrect combinations of spin properties. The set of components comprises: 1) the angular momentum coupling unit of the first sub-system; 2) the spin-orbit coupling unit of the first sub-system; 3) the heavy-atom effect activation unit of the first sub-system; 4) the coupling constant derivation unit of the first sub-system; 5) the spin-property verification module of the third sub-system; 6) the incompatible-observable verification unit of the third sub-system; and 7) the angular-momentum accuracy verification module of the third sub-system. In the end, the quantum DoS attacking module makes a large number of quantum states be decohered in other quantum systems via controlling the temperature of the other quantum systems. Combining the above three elements in an implementation of software, hardware, or a combination of software and hardware into the third sub-system helps to perform an effective counterattack mechanism against APT (advanced persistent threat) from other quantum systems in the phases of quantum key storing, clearing, and recycling. Such combination is further capable of rapidly consuming system resources on the attacker side, so that it paralyzes the attacker's limited computing force due to cost considerations. These are effects that cannot be achieved by conventional technology.

The above embodiments of the present invention support to implement a system for use in a key management mechanism to resist quantum computing attacks in different key management phases such as quantum key storage, quantum key clearing, and quantum key recycling. The present invention provides a complete architecture of quantum computing attack resistance for general quantum key management systems (KMS) or key distribution centers (KDC). This technology can be implemented as a high-strength quantum-attack-resistant key management device or system, and can be implemented on a server side or a cloud service platform. In some embodiments, this technology not only detects and avoids quantum attacks, but also optionally implements basic or advanced counterattacking modules. In addition, the relevant technical means of this system can be practiced by devices with reasonable cost, effectively overcoming the bottleneck of most current PQC schemes that must be operated through high-cost equipment, and also provides several effects of a cyber-security mechanism that cannot be supported by the current PQC schemes for use in a key management system.

DETAILED DESCRIPTION OF THE INVENTION

To facilitate understanding of the objects, characteristics and effects of this present disclosure, embodiments together with the attached drawings for the detailed description of the present disclosure are provided.

A plurality of embodiments in regard to a quantum-attack quantum key resistant operating system for use in a key management mechanism which is capable of resisting quantum computing attacks in different phases (such as quantum key storage, quantum key clearing, quantum key recycling, etc.) of a quantum key management mechanism are provided as follows. In an embodiment of this aspect, the system can be further implemented with a complete architecture of quantum computing attack resistance for general quantum key management systems (KMS) or key distribution centers (KDC) to be a high-strength quantum-attack-resistant key management device or system, and can be implemented on a server side or a cloud service platform.

Figure 1:
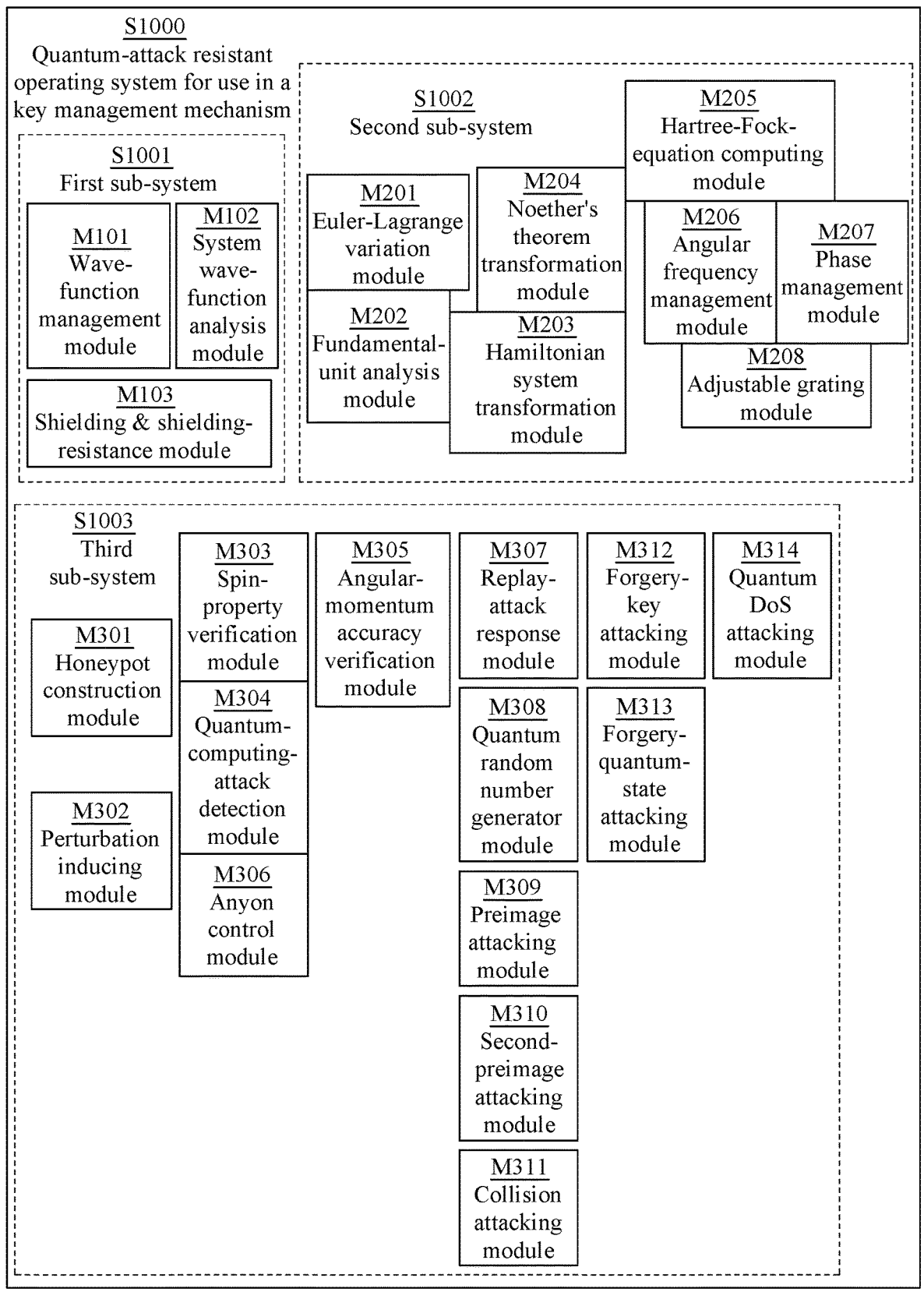
FIG. 1 is a structural block diagram of a system according to an embodiment of the present invention.

Refer to FIG. 1, which is a structural block diagram of a system according to an embodiment of the present invention. The quantum-attack resistant operating system for use in a key management mechanism S1000 comprises at least a first sub-system S1001, a plurality of second sub-system S1002, and a plurality of third sub-system S1003. In most embodiments of the present invention, the first sub-system S1001 can be implemented as a quantum-key-storage sub-system, the second sub-system S1002 can be implemented as a quantum-key-clearing sub-system, and the third sub-system S1003 can be implemented as a quantum-key-recycling sub-system. The quantum key recycling mentioned in the present invention for maintaining a key life cycle comprises phases such as key recycling, key updating, key rotating, etc. For example, as shown in FIG. 1, the first sub-system S1001 resists quantum computing attacks of quantum key tampering, destroying, detecting, and blocking, from other systems in phases of quantum key storage; the second sub-system S1002 avoids quantum computing attacks from other systems sniffing on the key entanglement properties in phases of quantum key clearing; and the third sub-system S1003 avoids quantum computing attacks from other systems that perform man-in-the-middle attacks in phases of quantum key recycling.

Figure 2A:
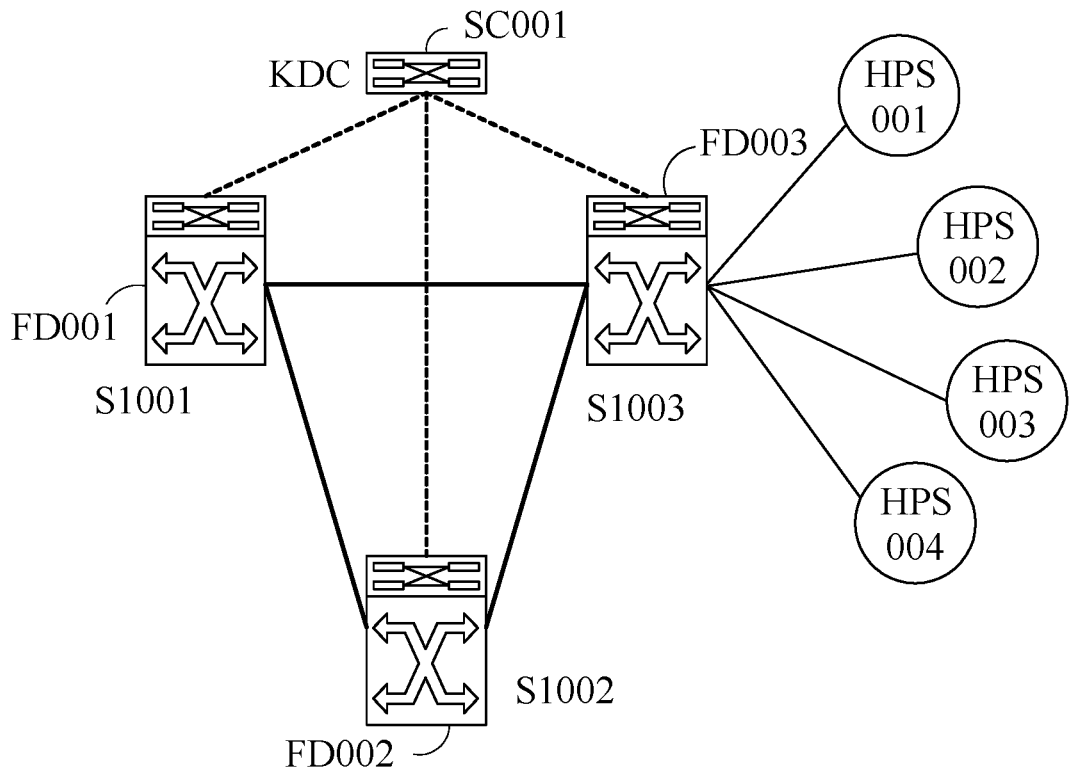
FIG. 2A is a schematic diagram of the system according to an embodiment for user scenario of the present invention.
Figure 2B:
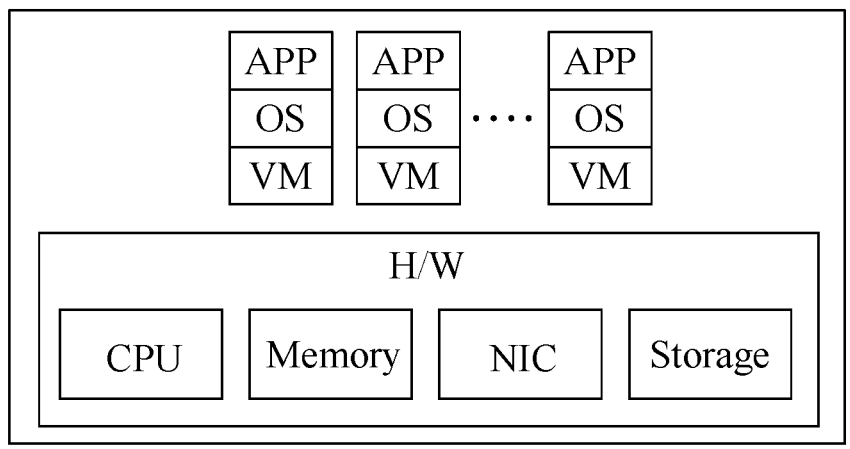
FIG. 2B is a schematic diagram of a virtualized server platform related to FIG. 2A.

Further refer to FIG. 2A, which is a schematic diagram of the system according to an embodiment for a user scenario of the present invention. In an embodiment, the system S1000 is in cooperation with a KDC (key distribution center). The three sub-systems (S10001~S1003) are implemented as a cloud cyber security service operating on a server-virtualization platform comprising a plurality of virtual machines and adopts SDN (software definition network) as the network infrastructure for internal communications. Wherein, the key management mechanism of a KDC is implemented in a software controller SC001 operating for an SDN. The first sub-system S1001 and the second sub-system S1002 can be implemented on a virtualized server platform (aka server-virtualization platform) which is configured as different forwarding devices of the SDN, such as FD001 for S1001 and FD002 for S1002. A feasible practice for the third sub-system S1003 is to implement it with a forwarding device FD003 of SDN and a plurality of honeypot servers (HPS001~HPS004). That means the system S1000 is capable of providing a plurality of third sub-systems, and each third sub-system S1003 can be configured on different honeypot servers (HPS001~HPS004) for resisting different suspicious or malicious quantum behaviors. The system S1000 is capable of cooperating with the KDC on an SDN through the forwarding devices (FD001~FD003). However, all of the sub-systems (S1001~S1003) are installed on a virtualized server platform. Also refer to FIG. 2B, which is an illustration for a virtualized server platform VSP001. Implementing the present invention with the virtualized server platform (VSP), each sub-system can bundle a VM (virtual machine) with a specified OS and a set of APP applications individually; here the APP mentioned in the VSP can be software applications, software development libraries, programming codes, etc. In some embodiment, the modules, sub-modules, units, or sub-units can be implemented as individual or integrated APPs; however, in some other embodiments, some sensitive modules such as a honeypot construction module (M301 shown in FIG. 1) or such as a quantum DoS attacking module (M314 shown in FIG. 1) may be implemented as a template of a VM separated from other modules. In some other embodiments, the system S1000 may need to perform various processes for various optical paths, thus a plurality of second sub-systems S1002 may be deployed on a plurality of VM or even on different physical servers. In addition, the above embodiments are only feasible examples for illustrating a user scenario of the present invention, and the implementation and deployment of the present invention is not limited thereto.

In an embodiment, referring to FIG. 1, in order to resist quantum computing attacks during a procedure of quantum key storage, the first sub-system S1001 at least comprises: a wave-function management module M101, a system wave-function analysis module M102, and a shielding & shielding-resistance module M103. Wherein, the wave-function management module M101 modifies a wave function via making use of the Schrödinger equation with momentum adjustment; the system wave-function analysis module M102 analyzes the wave functions through operations of the Born-Oppenheimer approximation, while the wave functions are adopted by quantum behaviors, mechanisms, approaches, or apparatuses of other systems, in a communication environment with optical path of quantum steering; and the shielding & shielding-resistance module M103 prevents processes and operations related to a quantum key in storage from being detected or blockaded by another quantum computing system.

Figure 4:
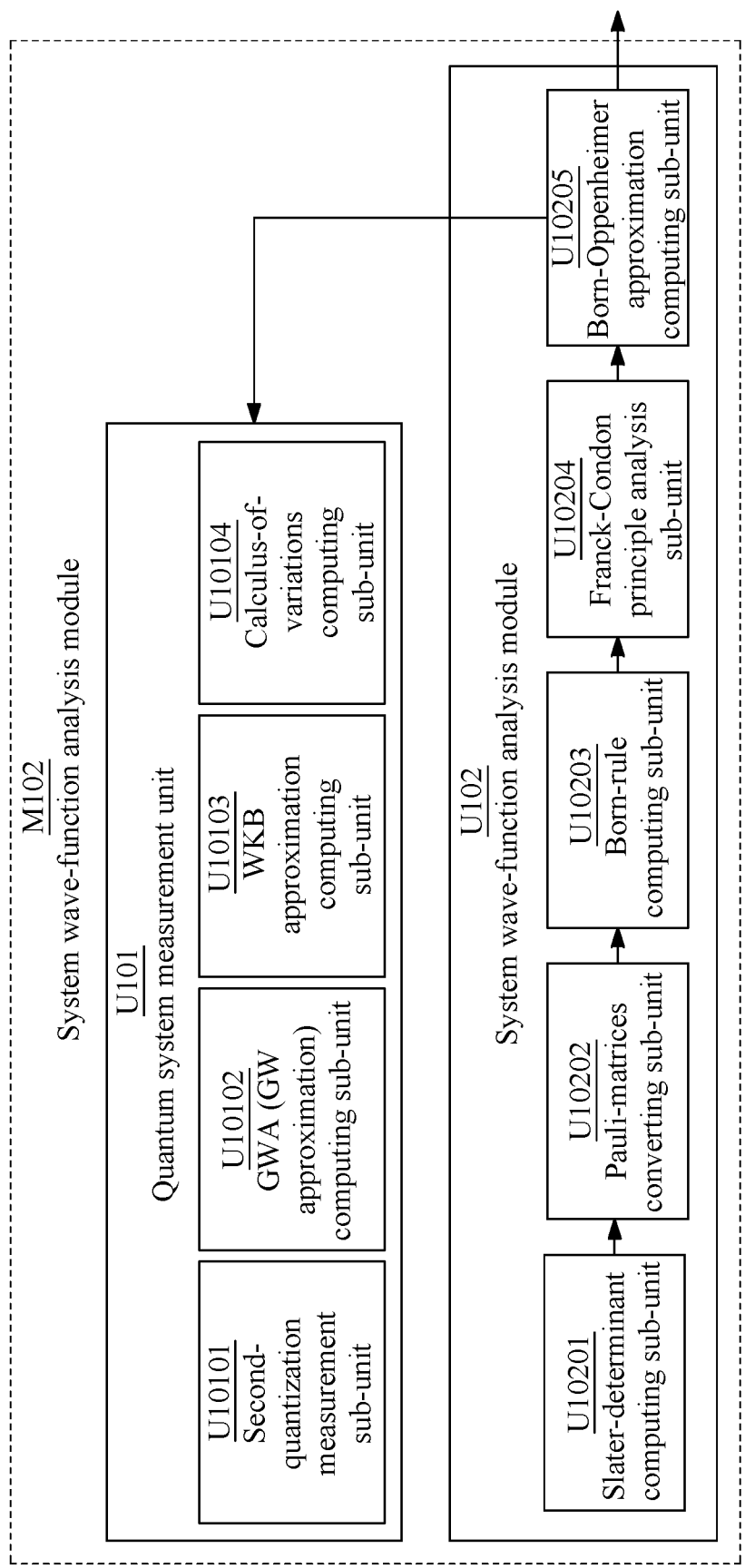
FIG. 4 is a block diagram of the system wave-function analysis module according to an embodiment of the present invention.

Referring to FIG. 4, in an embodiment, in order to estimate a system wave function for an unknown quantum system promptly via making use of the Born-Oppenheimer approximation with matrices operations for a nuclear wave function. The system wave-function analysis module M102 of the first sub-system S1001 comprises: a Slater-determinant computing sub-unit U10201, a Pauli-matrices converting sub-unit U10202, a Born-rule computing sub-unit U10203, a Franck-Condon principle analysis sub-unit U10204, and a Born-Oppenheimer approximation computing sub-unit U10205. Wherein, the Slater-determinant computing sub-unit U10201 transforms a plurality of results of wave-function measurements into a form of Slater determinant with bases, via a data pre-processing program and a normalizing process with eigen vectors and eigen values, where the data pre-processing program comprises subroutines of missing data handling, outlier handling, and duplicate-data handling. Thereafter, the Pauli-matrices converting sub-unit U10202 performs a pre-processing program and a converting process for converting a Slater determinant into a form of a plurality of Pauli matrices to express a plurality of observations. The pre-processing program comprises the processes of 1) a Hartree method process with a Hartree product to process the Slater determinant for obtaining a combination of wave functions, such as the description: $\Psi(x_1,x_2,x_3, \ldots x_p)=\psi_\alpha(x_1)\psi_\beta(x_2)\psi_\gamma(x_3) \ldots \psi_\pi(x_p)$; 2) a linear dependence filtering process to discard the linear dependent cases; 3) an order rationality verification process with wedge product (aka exterior product) operations to discard the cases in which the data is arranged in an incorrect or wrong sequence on the determinant, such as verifying $$\Lambda(V) = \bigoplus_{k=0}^{\infty} \Lambda^k V$$

with a corresponding geometry structure; 4) a fermion filtering process to discard fermion related cases, 5) a verification process with Hund's rule of maximum multiplicity to discard the cases which follow Hund's rule of maximum multiplicity, while the maximum multiplicity implies maximum total spin quantum number in a practice of this process; 6) a degenerate state filtering process with Hund's rules (the first rule) to discard degenerate cases; 7) a filtering process with the Tolman-Oppenheimer-Volkoff equation via the Schwarzschild metric with the Reissner-Nordström metric, the Kerr metric or the Kerr-Newman metric (via $ds^2=e^{v(r)}c^2dt^2-(1-2GM(r)/re^2)^{-1}dr^2-r^2(d\theta^2+\sin^2\theta d\phi^2)$, for filtering micro substances with artificial gravity and strong magnetic fields; 8) a filtering process based on Electron degeneracy pressure $$\left(P_e = \frac{(3\pi^2)^{2/3}\hbar^2}{5m_e}\rho_e^{5/3}.\right)$$

to discard wrong artificial cases or real collapsing cases, through observation on electron density $\rho_e$; 9) a filtering process via making use of the Zeeman effect, for discarding cases of degeneration or magnetic interference; 10) a non-identical particle filtering process to assure that all the measured particles are identical particles; 11) an incompatible observable filtering process to assure that all the observables are compatible observables, via verifying commutation relation with an uncertainty principle (checking commutation relation between an observable and a Fourier-transformed observable); 12) a second-quantization observable filtering process to discard a second-quantized observable via making use of creation and annihilation operators, and 13) an angular-momentum-coupled observable filtering process based on Clebsch-Gordan coefficients to discard the observable coupled by the operators of $J^2$, $S^2$, and $L^2$.

In an embodiment, the above-mentioned Born-rule computing sub-unit U10203 derives transition probability corresponding to each observation via making use of the Born rule. Thereafter, the Franck-Condon principle analysis sub-unit U10204 performs a pre-processing program to derive a quantum harmonic oscillator function, and analyzes the derived transition probability with the derived quantum harmonic oscillator function via making use of the Franck-Condon principle of quantum mechanics, so as to derive a distribution of the transition probability and the approximate solution of a quantum wave function and a nuclear wave function, wherein the pre-processing program comprises the following steps: 1) finding zero-point energy from zero oscillations to derive the ground state of a wave function; 2) performing nondimensionalization for the wave function corresponding to the derived ground state to obtain an approximate solution for the quantum wave function; 3) repeating step 2) to find a plurality of ground states for the available zero oscillations to obtain a plurality of wave functions; 4) coupling the available wave functions as a quantum harmonic oscillator; 5) performing a quasi-particle filtering process to discard quasi-particle related cases (discarding the solid cases and the harmonic-oscillator synthesis cases); 6) performing a one-dimensional harmonic oscillator filtering process to discard degenerate cases (with form of one-dimensional harmonic oscillator); 7) performing a resolution process for a time-independent Schrödinger equation derived from an eigenstate so as to derive a nuclear wave function, while the eigenstate is derived from spectrum analysis; and 8) performing nondimensionalization for the derived nuclear wave function to obtain an approximate solution of the nuclear wave function. Thereafter, the Born-Oppenheimer approximation computing sub-unit U10205 performs a pre-processing program and a Born-Oppenheimer approximation process based on the approximate solutions of the particle wave function and the nuclei wave function to obtain an approximate solution of a system wave function (based on $\Psi_{total}=\psi_{electronic}\psi_{nuclear}$), and then performs a post-processing program. The pre-processing program comprises the following subroutines: 1) confirming that the nuclei is much heavier than electrons (for example: the much usually means $10^3 \sim 10^4$ times); 2) making use of the Franck-Condon factor (in the form of $\int \psi_v^{"} \psi_v dr_n$) for confirming that the value of an extinction coefficient is in a valid range; 3) performing a phonon filtering process to discard phonon cases; and 4) confirming that the transition dipole surface fits the condition of Condon approximation. The Born-Oppenheimer approximation process comprises the following steps: 1) expressing the system Hamiltonian with a nuclear kinetic energy operator and an electron Hamiltonian (such as $\hat{H}=\hat{T}_n+\hat{H}_e$); 2) introducing the electron Hamiltonian into an electronic Schrödinger equation for deriving electronic wave functions and a potential energy surface (to resolve: $\hat{H}_e \chi(r,R)=E_e(R)\chi(r,R)$); 3) making use of density functional theory on the electronic Schrödinger equation to obtain the potential energy surface (PES); 4) performing a validation subroutine to confirm that the electronic state is sufficiently separated from other electronic states; 5) performing another validation subroutine with the Born rule for the transition probability derived from the obtained PES to assure that the transition probability derived from the obtained PES fits the one (based on:

$$p(a \leq x \leq b) = \int_a^b |\langle x | \psi \rangle|^2 dx)$$

derived from the Born rule; 6) dropping the points near conical intersections on the PES; 7) performing BO approximation on the processed PES to derive an approximate solution of a system wave function (and then expressing the system wave function in the form of a harmonic oscillator wave function); 8) performing symmetry and asymmetry validation processes on the derived harmonic oscillator wave function; and 9) performing a verification process on the derived approximate solution with the angular-momentum accuracy verification module (M305 shown in FIG. 1) of the third sub-system for confirming that the solution is feasible; and the post-processing program of the Born-Oppenheimer approximation computing sub-unit U10305 comprises the following subroutines: 1) monitoring the variation of the wave functions estimated by the above approximations; 2) finding linear combinations of the wave functions through the superposition principle; 3) expressing the wave functions into the form of a Bloch sphere; 4) combining the Bloch-sphere expressions and the linear combination of wave functions as attributes of a quantum system; 5) introducing a time variant term to the Schrödinger equation for predicting a decoherence status; 6) correcting the approximate solution according to the interference caused by the variation of temperature in the quantum system; 7) storing the combined attributes into a database; 8) configuring patterns composed of the attributes stored in the database for cyber firewalls; 9) performing an identification process with the database for identifying the attacker group; 10) configuring patterns composed of the attributes stored in the database as blocklist/allowlist for quantum communication; 11) performing a quantum interfering process against the attacker side with the wave functions stored in the database; 12) performing a history analyzing process to the database for predicting malicious behaviors from the attacker side; 13) receiving instructions from a honeypot construction module for sharing the database; 14) performing a von-Neumann-entropy analyzing process on the stored approximate solutions for creating additional patterns for a quantum system; 15) performing a second-quantization identification process on the stored approximate solutions functions for identifying a wave function made by second-quantization operation; 16) performing another identification process on the stored approximate solutions functions for identifying a wave function which cannot be analyzed by a functional analysis process or is operated with an excited-state; 17) performing another identification process on the stored approximate solutions for identifying a slow-varying wave function; 18) performing another identification process on the stored approximate solutions for identifying a fast-varying wave function; 19) creating additional patterns with the combination of results of wave-function measurements; 20) performing a regression process on the results of wave-function measurements; 21) performing a non-linear PCA process on the results of wave-function measurements; 22) performing an analyzing process with Chaos models for the results of wave-function measurements with time-variant feature; and 23) performing an A.I. analyzing process on the results of wave-function measurements.

In some embodiments, combining the above five elements (U10201~U10205) in an implementation of software, hardware, or a combination of software and hardware as a system wave-function analyzing unit U102 can quickly get an idea of an unknown wave function, and fulfil the system database with valuable patterns efficiently. This is an effect that cannot be achieved by conventional technology.

In an embodiment, referring to FIG. 4, in order to enhance the measurement ability to quantum computing attacks and suspicious quantum behaviors, and enhance the ability of pattern extraction coupled to the Born-Oppenheimer approximation computing sub-unit U10205 of the system wave-function analysis module M102, meanwhile resisting a quantum computing attack promptly and providing the ability of history tracing, the system wave-function analysis module M102 of the first sub-system S1001 further comprises a set of sub-units (U10101~U10104) and there is a pre-processing program before performing the set of sub-units and there is also a post-processing program after performing the set of sub-units, wherein the pre-processing program is to discard the measurements with degenerate states. The post-process program comprises the following subroutines: 1) performing a verification subroutine with the angular-momentum accuracy verification module (M305 shown in FIG. 1) of the third sub-system S1003 to assure that the current measurement is feasible; 2) dropping the computing result derived from an approximation computing process (for example: the result derived from U10102 as shown in FIG. 4 with a GW approximation computing process) and performing a measurements processing program for pattern extraction without approximation when the computing result cannot pass the above verification process successfully; 3) dropping the computing result and performing a measurements processing program for pattern extraction without approximation when the computing result derived from an approximation cannot tend to convergence; 4) dropping the computing result and performing a measurements processing program for pattern extraction without approximation when a WKB computing failed in an asymptotic expansion; 5) dropping the computing result and performing a measurements processing program for pattern extraction without approximation when a WKB computing processes a ground state of many-particle system (in practice, that means the variation rate of wave phases being faster than the variation rate of wave amplitudes when introducing time variants); and 6) tagging a malicious label on the measurements which cannot be analyzed or post-processed by the system wave-function analysis module M102. The set of sub-units working with the above pre-process program and the post-process program comprises: 1) a second-quantization measurement sub-unit U10101 for measuring a harmonic-oscillator attack launched through a second quantization; 2) a GWA (GW approximation) computing sub-unit U10102 with the ability of GWA and perturbation computing, for measuring excited-state attacks, or a quantum attack on which functional analysis cannot be performed; 3) a WKB approximation computing sub-unit U10103 for measuring quantum attacks of a slow-varying wave function; and 4) a calculus-of-variations computing sub-unit U10104 which performs a calculus-of-variations computing process for measuring quantum attacks of a fast-varying wave function via using calculus of variations of functional analysis. The calculus-of-variations computing process comprises the following subroutines: 1) confirming whether there is an extremum to the measurement; 2) confirming that the data of measurements can be expressed as a curve with a set of equations; 3) confirming that the expressed curve is continuously differentiable; 4) confirming that the dimension of the measurements is reasonable; 5) finding the critical points in the domain of the expressed curve so as to determine the boundary for the calculus operations; and 6) performing Calculus-of-Variations computing operations on the expressed curve. In some embodiments, combining the above four elements (U10101~U10104) in an implementation of software, hardware, or a combination of software and hardware into a quantum system measurement unit U101 not only can cover to perform effective measurements on the wave functions caused by various quantum computing attacks, but also enhances the system database with more advanced patterns. In some embodiments, facing some known quantum computing attacks, the system wave-function analysis module M102 may drive U101 prior to U102 for obtaining a feasible estimation of a malicious wave function without or with little delay. In some other embodiments, facing unknown quantum computing attacks, the system wave-function analysis module M102 may drive U102 prior to U101 for obtaining more applicable patterns at a first glance so that a KDC or KMS will be able to perform more evaluations based on the derived pattern data to make further decisions. These are effects that cannot be achieved by conventional technology.

Figure 5:
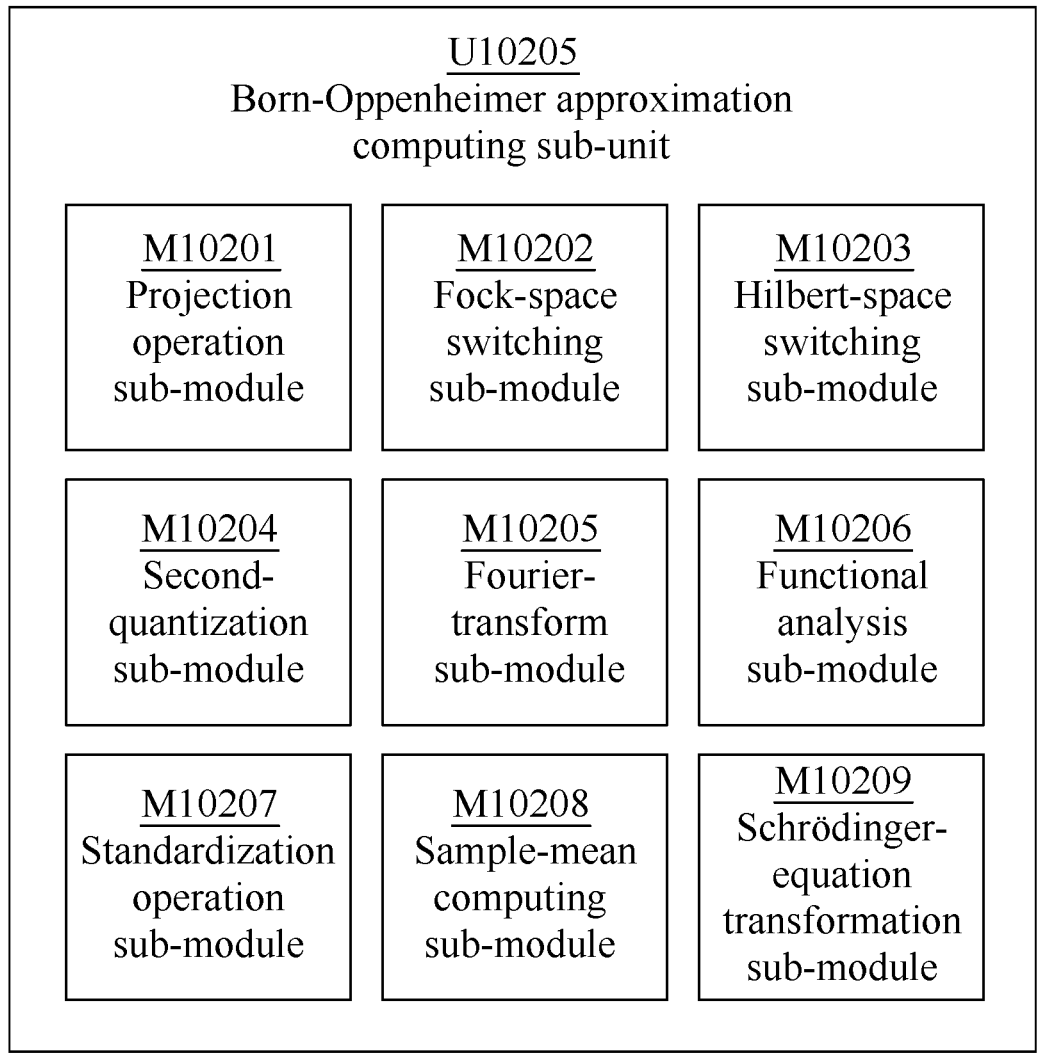
FIG. 5 is a block diagram of a Born-Oppenheimer approximation computing sub-unit according to an embodiment of the present invention.

Referring to FIG. 5, in an embodiment, for the cases requiring the Born-Oppenheimer approximation, in order to express an initial equilibrium state with bases derived from a plurality of wave-function measurements for use in a Born-Oppenheimer approximation computing process in the condition of zero-point energy, so as to facilitate the operations of the Born-Oppenheimer approximation, thereby to perform pattern-extraction from the derived initial equilibrium states for analyzing whether there is a common source for the measured wave functions, the Born-Oppenheimer approximation computing sub-unit U10205 of the system wave-function analysis module M102 of the first sub-system S1001 further comprises: a projection operation sub-module M10201, a Fock-space switching sub-module M10202, a Hilbert-space switching sub-module M10203, a second-quantization sub-module M10204, a plurality of Fourier-transform sub-module M10205, a functional analysis sub-module M10206, a standardization operation sub-module M10207, a sample-mean computing sub-module M10208, and a Schrödinger-equation transformation sub-module M10209.

In an embodiment, the projection operation sub-module M10201 estimates a linear combination of qubits for a measured quantum system via making use of projection operators. Moreover, the Fock-space switching sub-module M10202 performs a Fock-space switching process to express a linear combination of qubits as a quantum system state via making use of a singular-integral operator of a Fock space. The Fock-space switching process comprises the following subroutines: 1) normalizing the linear combination of qubits; 2) finding the bases represented to various Hilbert spaces; 3) expressing the linear combination of bases in a form of Fock space (expression:

$$F_v(H) = \bigoplus_{n=0}^{\infty} S_v H^{\otimes n} = C \oplus H \oplus (S_v(H \otimes H)) \oplus (S_v(H \otimes H \otimes H)) \oplus \ldots );$$

4) performing Fock-space operations via making use of norm, tensor product, inner product, direct sum, and complex scalar to obtain Fock states (reference form: $\widehat{N_{k_i}} |n_{k_1}, n_{k_2}, \ldots n_{k_i} \ldots \rangle = n_{k_i} |n_{k_1}, n_{k_2}, \ldots n_{k_i} \ldots \rangle$ ); 5) performing a filter to drop the linear combination if there is a Fock state represented to a combination of fermions and bosons; and 6) performing a singular-integral operation (relates to:

$$\|f\|_{\mathcal{F}^2(\mathbb{C}^N)} := \int_{\mathbb{C}^n} |f(z)|^2 e^{-\pi |x|^2} dz.)$$

on the Fock space to obtain states of a quantum system. Thereafter, the Hilbert-space switching sub-module M10203 performs a pre-processing program and a Hilbert-space switching process to switch quantum system state of a Fock space into a form of multi-dimensional Hilbert space, wherein the pre-processing program comprises the following steps: 1) selecting the corresponding orthogonal bases in a Hilbert space according to the quantum system state of a Fock space; 2) performing projection operations with projection operator and the orthogonal bases for the quantum system state; 3) performing unitary transformation on the projected quantum system state; 4) deriving wave functions according to the corresponding bases from the transformed quantum system state; 5) performing eigenization on the derived wave functions to derive eigenvalues and eigenvectors. The Hilbert-space switching process comprises the following steps: 1) converting the eigenized result derived from the pre-processing program into a complex Hilbert space to express the eigenstate with a plane-wave term and a bound-state term; 2) handling to extract the bound states from the complex Hilbert space; 3) simulating the bound state with combination of harmonic oscillators to derive corresponding harmonic wave functions according to the bound states; 4) handling the harmonic wave function with a spectral method to derive an energy-level equation that helps to obtain the corresponding energy spectrum of a harmonic wave function; 5) adopting a Hilbert-Schmidt operator (form of:

$$\|A\|_{HS}^2 = \sum_{i \in I} \|Ae_i\|^2)$$

as an identity operator to perform dimension verification for the harmonic wave functions to confirm whether the above transformation is successful; and 6) performing inner-product operations on the harmonic wave functions for discarding the wave functions of a local system to assure that the current quantum system states are from other systems (in practice: through inner-product operations to derive distance relation between particles for determining whether the wave function relates to the local system). In addition, the second-quantization sub-module M10204 performs a second-quantization process on a quantum system state of Hilbert space via making use of creation and annihilation operators, and the result of the second-quantization process is for describing the Hamiltonian of the quantum system. However, the Born-Oppenheimer approximation computing sub-unit U10205 comprises a plurality of Fourier-transform sub-modules M10205 that each performs Fourier transform on a Hamiltonian of a quantum system to eliminate the uncertainty of the physical quantity of position and the uncertainty of the physical quantity of momentum, and then performs a verification with Parseval's theorem to confirm the transformed result is correct, and thereby obtains two kinds of transformed system physical quantities. Moreover, the functional analysis sub-module M10206 performs functional analysis on the determined transformed system physical quantities, obtains a probability distribution via making use of calculus-of-variations method, and derives energy states via making use of a Bessel function, thereby extracting more features of a wave function. Thereafter, the standardization operation sub-module M10207 performs a standardization operation on a probability distribution. Thereafter, the sample-mean computing sub-module M10208 estimates a sample mean and a set of moments with various moment ordinal, based on a standardized probability distribution in a sample space, in addition, the sub-module M10208 also provides linear combinations of various estimated values of a plurality of particles, and meanwhile analyzes the sum of probability in a sample space and performs a Markov process to verify whether a linear combination of the probability distribution is continuous and random. Thereafter, the Schrödinger-equation transformation sub-module M10209 expresses the quantum system state as a time-dependent Schrodinger equation based on the estimated sample mean, moments, standardized probability distribution, and the determined converted system physical measurements, so as to derive the initial equilibrium state required for a Born-Oppenheimer approximation.

In some embodiments, combining the above nine elements (M10201~M10209) in an implementation of software, hardware, or a combination of software and hardware into a Born-Oppenheimer approximation computing sub-unit U10205 not only facilitates the operations of Born-Oppenheimer approximation, but also supports to speedily perform pattern-extraction from the derived initial equilibrium states for analyzing whether there is a common source for the measured wave functions. This is an effect that cannot be achieved by conventional technology.

Figure 3A:
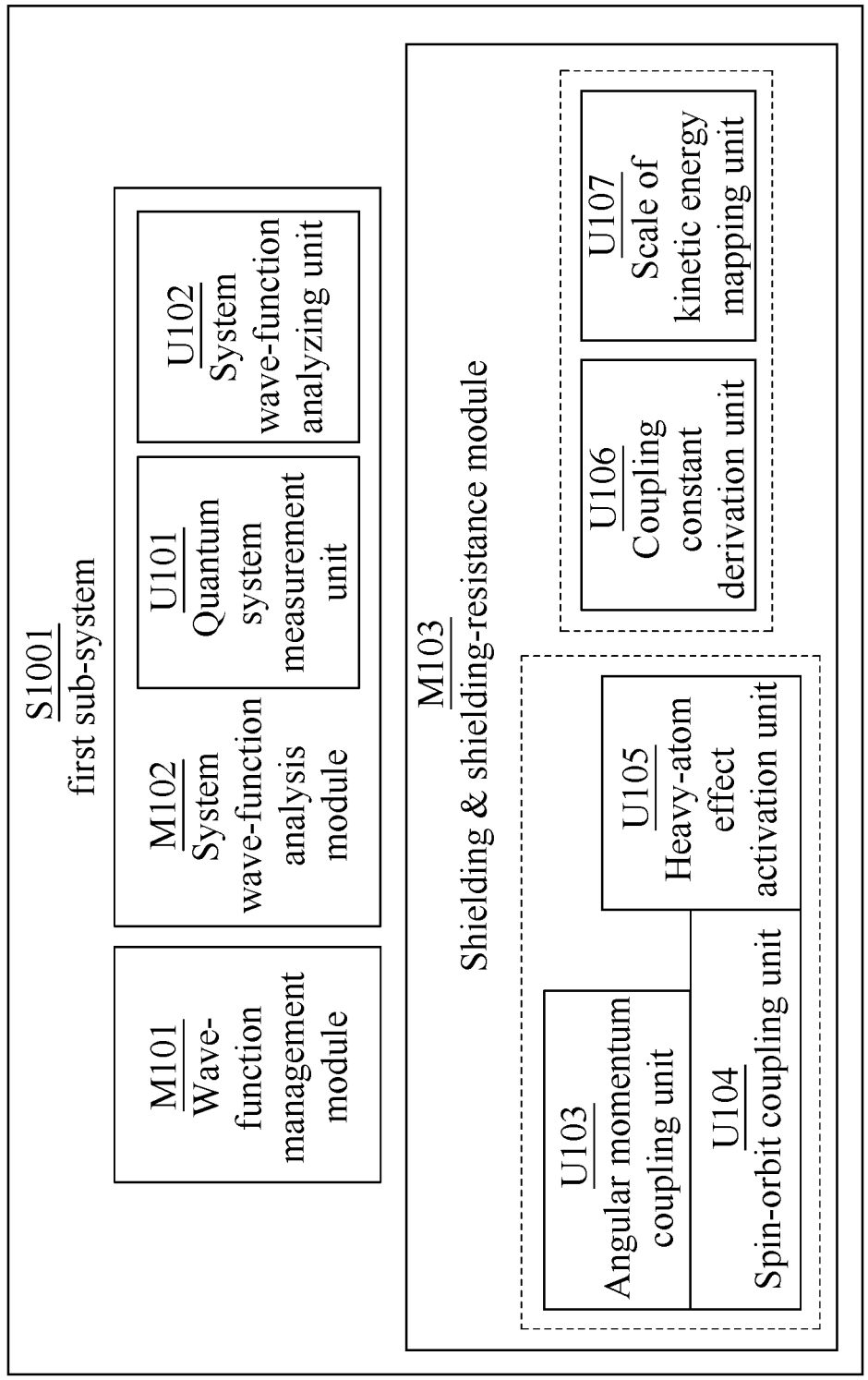
FIG. 3A is a structural block of the first sub-system according to an embodiment of the present invention.

Further, referring to FIG. 3A, in an embodiment, the above-mentioned first sub-system S1001 will determine whether there is an abnormal quantum-system wave function in the quantum communication environment according to the analyzed result derived from the system wave-function analysis module M102, so as to determine whether a shielding & shielding-resistance mechanism needs to be performed, and works with the wave-function management module M101 to prevent processes and operations related to a quantum key in storage from being detected or blockaded by quantum computing attacks from other systems. The above-mentioned shielding & shielding-resistance module M103 comprises: an angular momentum coupling unit U103, a spin-orbit coupling unit U104, a heavy-atom effect activation unit U105, a coupling constant derivation unit U105, and a scale of kinetic energy mapping unit U107. Wherein, the angular momentum coupling unit U103 performs a pre-process for spin-pairing and a process for angular momentum coupling to obtain a required spin angular momentum that is the same as the spin angular momentum of other systems. Thereafter, the spin-orbit coupling unit U104 performs a j-j coupling process to couple orbit angular momentum l with spin angular momentum s, such as the description which is for a heavy atom:

$$J = \sum_i j_i = \sum_i (\ell_i + s_i).$$

Thereafter, the heavy-atom effect activation unit U105 triggers transition effect through enhancing the coupling effect of the spin-orbit. Moreover, the coupling constant derivation unit U106 derives a coupling constant via calculating the incidence rate of the transition effect. Finally, the scale of kinetic energy mapping unit U107 creates a mapping data of the coupling constant and the scale of kinetic energy according to the relations between coupling constant and the scale of kinetic energy.

In a quantum communication environment with optical paths, a shielding attack from other quantum systems may make an end user fail to get a quantum key through remote access. In an embodiment, the above-mentioned angular momentum coupling unit U103, spin-orbit coupling unit U104, and the heavy-atom effect activation unit U105 can work together for performing a shielding-resistance mechanism via making use of the transition effect, so as to prevent the quantum key from being blockaded by a shielding attack from other quantum systems. Moreover, the above-mentioned coupling constant derivation unit U106 and the scale of kinetic energy mapping unit U107 can work together for performing a shielding mechanism coupled to the wave-function management module M101 via providing a required angular momentum parameter derived from the mapping data of the coupling constant and the scale of kinetic energy, so as to adjust the wave function of a quantum channel to prevent the quantum state of processes and operations related to a quantum key in storage from being detected by the attacked side through the quantum communication channel.

Figure 3B:
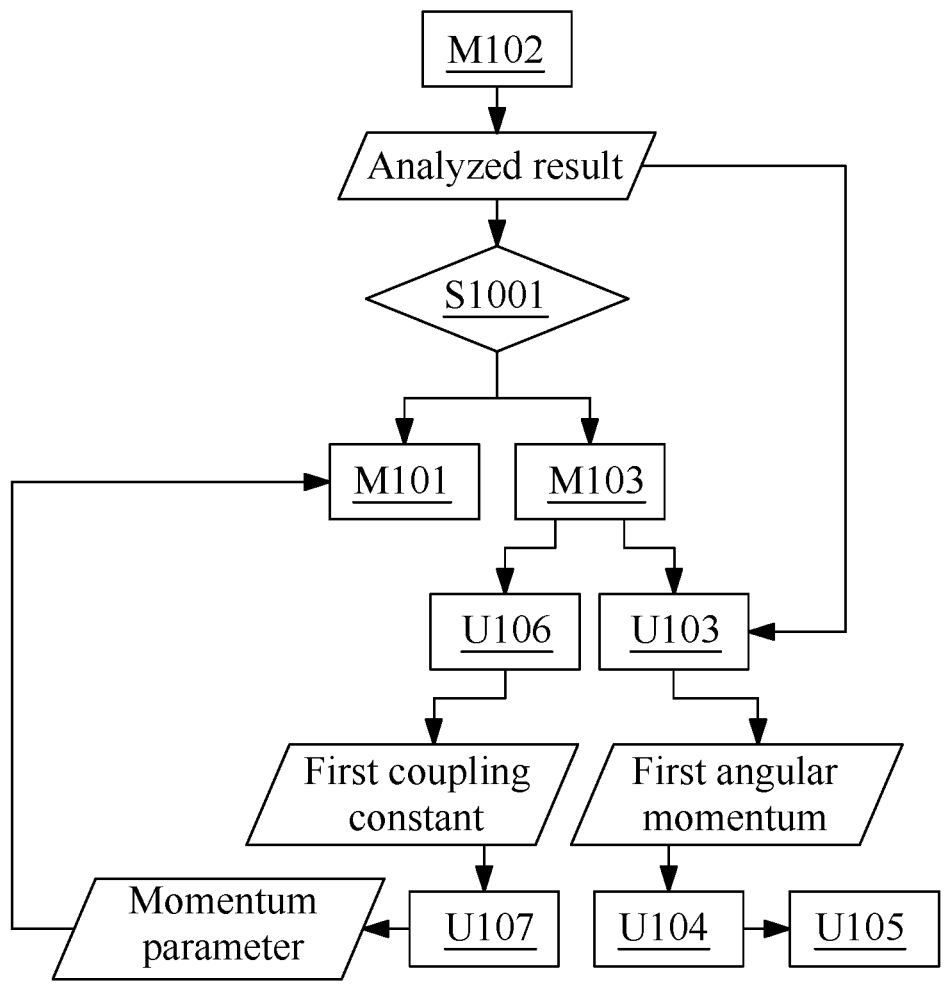
FIG. 3B is a dataflow diagram of the first sub-system according to an embodiment of the present invention.

Also referring to FIG. 3B which is a dataflow diagram for the shielding & shielding-resistance mechanism, according to the analyzed result derived from system wave-function analysis module M102, the first sub-system S1001 determines whether to perform a shielding or shielding-resistance mechanism through M103, or to adjust the system wave function through the wave-function management module M101. For performing a shielding-resistance mechanism, the angular momentum coupling unit U103 derives a first angular momentum which is the required angular momentum that is the same as the attacker side, and then the dataflow goes through U104 to complete spin-orbit coupling so that U105 can trigger the transition effect based on the coupling of spin-orbit derived from the same angular momentum as the attacker side, thereby a shielding effect will be destroyed due to the triggered transition effect. For performing a shielding mechanism, the coupling constant derivation unit U106 derives a first coupling constant via calculating the incident rate of the transition effect for the attacker side, and then U107 derives a momentum parameter based on the first coupling constant through a kinetic energy mapping, so that M101 can manage to change the current system wave function according to the momentum parameter provided by U107, thereby the attacker side will fail to detect the quantum state of a quantum key in a key storing phase, thus the shielding mechanism is practiced. Combining the above five elements (U103~U107) in an implementation of software, hardware, or a combination of software and hardware into a shielding & shielding-resistance module M103 provides an effect that cannot be achieved by conventional technology.

In an embodiment, referring to FIG. 1, the system S1000 comprises at least a second sub-system S1002, and the second sub-system S1002 resists quantum computing attacks during a procedure of quantum key clearing. In order to adjust the refractive index of an optical path based on a kinetic-energy term, the second sub-system S1002 at least comprises: a Euler-Lagrange variation module M201, a fundamental-unit analysis module M202, and a Hamiltonian system transformation module M203. The Euler-Lagrange variation module M201 performs calculus of variations for time and optical path, and then derives a stationary value of least action through the Euler-Lagrange first equation with functional analysis. Thereafter, the fundamental-unit analysis module M202 converts the least action to a description related to momentum through fundamental units. Thereafter, the Hamiltonian system transformation module M203 converts the description related to momentum to a generalized momentum in a Symplectic manifold and derives a kinetic-energy term through the quadratic form of the generalized momentum.

In an embodiment, in order to implement the management ability to the refractive index of an optical path via breaking the conservation of angular momentum based on the kinetic-energy term derived from the Hamiltonian system transformation module M203 of the second sub-system S1002, so as to bypass quantum computing attacks and suspicious quantum behaviors, to prevent from being detected via quantum teleportation, and to perform fake responses through quantum transmission within optical paths, the second sub-system S1002 further comprises: a Noether's theorem transformation module M204, a Hartree-Fock-equation computing module M205, an angular frequency management module M206, a phase management module M207, and an adjustable grating module M208. Wherein, the Hartree-Fock-equation computing module M205 performs a Hartree-Fock-equation computing process to calculate the minimum required kinetic energy for breaking conservation via making use of a Hartree-Fock equation. The Hartree-Fock-equation computing process comprises the following steps: 1) expressing a conserved quantity of angular momentum with a Slater determinant; 2) performing central force field approximation on the Slater determinant to obtain a molecular orbital wave function; 3) performing calculus of variations on the molecular orbital wave function to obtain a one-electron orbital wave function; 4) resolving the one-electron orbital wave function to obtain a solution; and 5) extracting the minimum required kinetic energy from the obtained solution. Thereafter, the angular frequency management module M206 manages to tune the angular frequency based on the minimum required kinetic energy. Thereafter, the phase management module M207 manages to tune the phase based on the minimum required kinetic energy. Finally, the adjustable grating module M208 performs a pre-processing program and then introduces the light wave that has completed the angular-frequency tuning process and the phase tuning process into a grating element implemented with electro-optic crystals, so as to derive the desired change in refractive index due to breaking the conservation of angular momentum. The pre-processing program coupled to a Bragg grating comprises the following subroutines: 1) analyzing the received wave packets to determine whether there is a dispersion issue, and correcting this issue via adjusting grating angle if needed; 2) determining whether there is a diffraction issue, and correcting this issue via adjusting slit spacing and intensity of incident light if needed; 3) determining whether there is a scattering issue, and correcting this issue via adjusting the angle of incident light against the grating; 4) eliminating electromagnetic interference; 5) confirming the resolution for the Bragg grating; 6) confirming the refractive index for the Bragg grating; and 7) introducing the light wave through the Bragg grating to the grating element implemented with electro-optic crystals.

In some embodiments, since the attacker side may perform analysis on the variation of physical quantity caused by a quantum-key-clearing phase to derive the spin property for the key generating process, combining the above eight elements (M201~M208) in an implementation of software, hardware, or a combination of software and hardware into a second sub-system S1002 effectively prevents the variation of the physical quantity from being measured by the attacker side in the phases of quantum key clearing, through temporarily adjusting the refractive index of the optical path for quantum communication. This is an effect that cannot be achieved by conventional technology.

Figure 6:
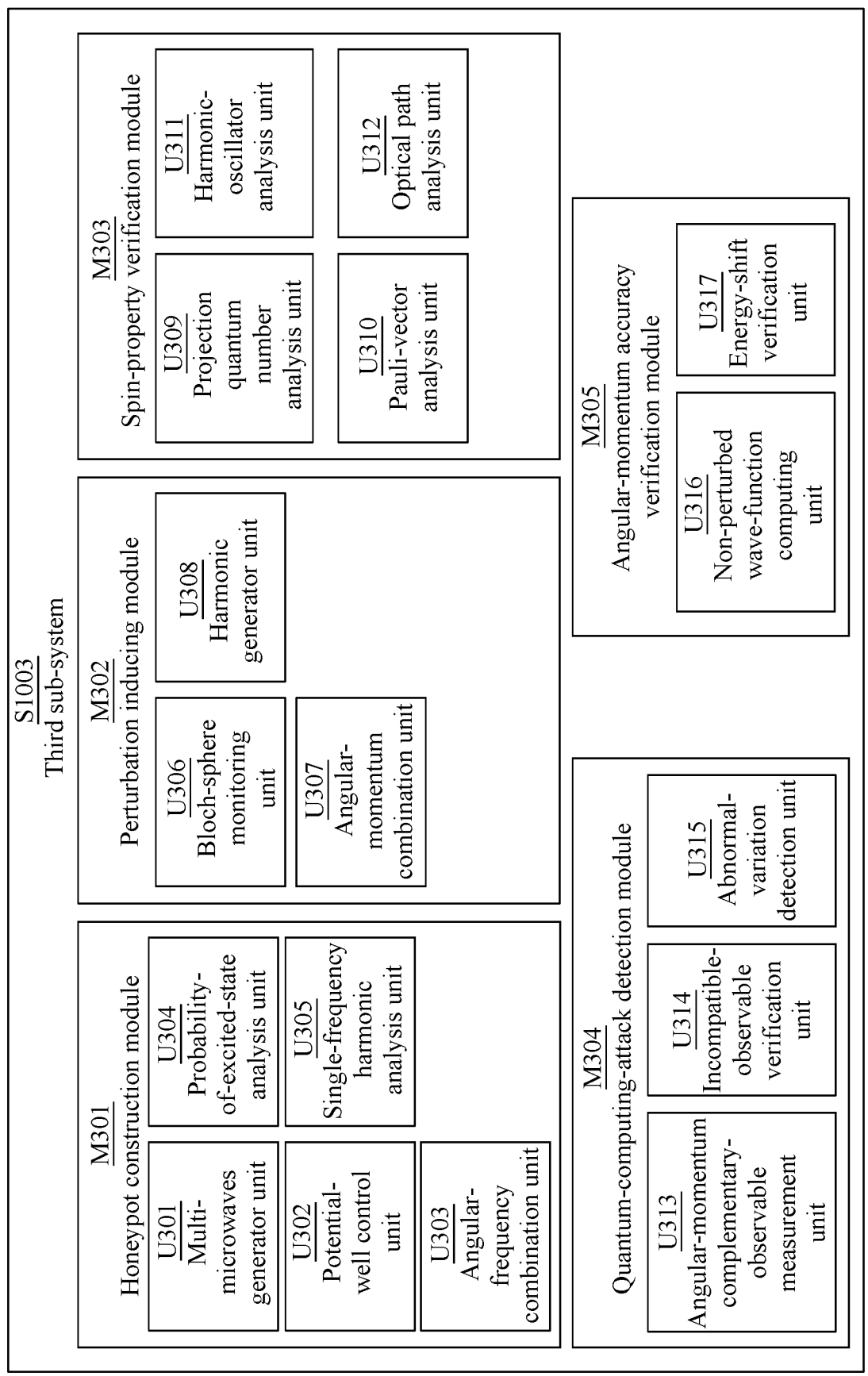
FIG. 6 is a structural block diagram of the third sub-system according to an embodiment of the present invention.

In an embodiment, the system S1000 comprises a plurality of third sub-systems S1003, and the third sub-system S1003 resists quantum computing attacks during a procedure of quantum key recycling. Referring to FIG. 6, the third sub-system S1003 comprises a plurality of the following modules: a honeypot construction module M301, and a perturbation inducing module M302. In some embodiments, a plurality of third sub-systems S1003 can be implemented with a plurality of honeypot servers (HPS001~HPS004 as shown in FIG. 2A). The honeypot construction module M301 constructs a specific honeypot to prevent the system from being attacked by other quantum operations during a quantum key recycling procedure. The honeypot construction module comprises: 1) a multi-microwaves generator unit U301 which can operate with photons to activate various transition effects through a plurality of microwave generators with different resonance frequencies; 2) a potential-well control unit U302 which controls energy-level shift via scattering processes and perturbation processes, so as to control the probability range of the transition effect; 3) an angular-frequency combination unit U303 which applies Fermi's golden rule on the transition effect of a discrete energy level for deriving a density of state based on required angular frequency, and then uses a plurality of Born approximation process based on scattering theory to derive corresponding scattering cross-sections and incident angles, so as to combine a plurality of angular frequencies as a spin attribute; 4) a probability-of-excited-state analysis unit U304 which analyzes the probability of an excited state according to the photoelectric effects measured from a high energy level to a low energy level for determining whether a potential well needs tuning; and 5) a single-frequency harmonic analysis unit U305 which expresses the prepared angular frequency as a single-frequency harmonic, and compares the harmonic with the measured distribution of transition probability to determine whether the prepared angular frequency is applicable. Thus, combining the above five elements (U301~U305) in an implementation of software, hardware, or a combination of software and hardware into a honeypot construction module M301 derives required patterns of transition effects and required patterns of angular frequencies timely and flexibly, so as to observe various suspicious or malicious quantum behaviors. This is an effect that cannot be achieved by conventional technology.

In addition, in an embodiment, referring to FIG. 6, the perturbation inducing module M302 which performs a perturbation inducing process based on the result with various bases derived from the honeypot construction module M301, so as to bypass or remove quantum computing attacks during the quantum key recycling procedures. The perturbation inducing module M302 comprises: 1) a Bloch-sphere monitoring unit U306 for monitoring quantum operation behaviors caused by non-native systems; 2) an angular-momentum combination unit U307 which combines different angular frequencies via making use of the honeypot construction module M301 as a required angular momentum according to the monitored result derived by the Bloch-sphere monitoring unit U306; and 3) a harmonic generator unit which generates a harmonic corresponding to the required angular momentum, wherein the harmonic generator unit U308 induces artificial atoms to shift via a perturbation process, so as to bypass or remove the quantum computing attacks from other systems. Thus, combining the above three elements (U306~U308) in an implementation of software, hardware, or a combination of software and hardware into a perturbation inducing module M302 can bypass or remove quantum peering behaviors timely and flexibly, so as to prevent the real information of a quantum key from being detected by the attacker side. This is an effect that cannot be achieved by conventional technology.

Referring to FIG. 1, in an embodiment, in order to implement the ability of disrupting other quantum systems, the third sub-system S1003 for resisting quantum computing attacks further comprises: a spin-property verification module M303, a quantum-computing-attack detection module M304, an angular-momentum accuracy verification module M305, and a plurality of anyon control module M306. The spin-property verification module M303 derives a topology attribute, a momentum attribute, and a polarization attribute of the spin property for a quantum via an eigenization process, so as to analyze whether a quantum owns a specific spin property. Thereafter, the quantum-computing-attack detection module M304 analyzes a deformed quantum computing attack to derive common bases and variation intervals for working with the spin-property verification module M303 so as to further lock on malicious quantum behaviors. Thereafter, the angular-momentum accuracy verification module M305 provides a verification computing process with perturbation theory, wherein the process is based on an angular momentum estimated by a sub-system to be compared with an angular momentum from other systems, for at least one of the first sub-system S1001, the second sub-system 1002, and the third sub-system S1003. In addition, a plurality of anyon control modules M306 is configured to control and adjust angular momentum to change spin orbit repeatedly to generate various wave functions via making use of an anyon two-dimensional model, so as to disrupt quantum operations from other systems.

In an embodiment, referring to FIG. 6, the above-mentioned spin-property verification module M303 comprises: a projection quantum number analysis unit U309, a Pauli-vector analysis unit U310, a harmonic-oscillator analysis unit U311, and an optical path analysis unit U312. The projection quantum number analysis unit U309 obtains the spin projection quantum number of multiplicity via an analysis process. The analysis process comprises the following subroutines: 1) performing projection measurement of spin along an arbitrary axis; 2) verifying the compatibility of spin measurements; 3) performing a verification based on spin-statistics theorem to confirm the rationality of related spin quantum numbers; 4) calculating the related spin quantum numbers of a quantum system wherein the combination of various kinds of quantum numbers will be configured to be a meaningful topological invariant; 5) performing a classification method based on the spin quantum numbers since the topological invariant derived from subroutine 5) can be treated as a kind of system feature; and 6) performing a plurality of measurements for verifying the rationality of the probability distribution. Thereafter, the Pauli-vector analysis unit U310 performs an analysis process for obtaining a complex plane coordinate to be a topological invariant as a quantum spin property via making use of the Pauli vector and Euler's formula, based on the spin projection quantum number of multiplicity. The analysis process comprises the following steps: 1) performing a verification of symmetry on the spin quantum numbers for discarding the spin quantum numbers with a specific combination of symmetry and asymmetry in order to avoid some false-positive cases; 2) performing complex analysis on the projection measurements and discarding measurements which cannot satisfy Euler's identity ($e^{i\pi}+1=0$); 3) performing complex analysis to express a corresponding Euler's formula ($e^{ix}=\cos x + i \sin x$) as a cis function (cis $\theta = \cos \theta + i \sin \theta$); 4) extracting the combination of parities (odds and evens) from a Pauli vector corresponding to the spin charges so as to form an attribute or feature for a quantum system; and 5) combining the results of the above steps as another kind of topological invariant as a quantum spin property. Thereafter, the harmonic-oscillator analysis unit U311 performs an analysis process on a quantum harmonic oscillator derived from the system wave-function analysis module (M102 shown in FIG. 1) of the first sub-system S1001 for obtaining a momentum feature as a quantum spin property via analyzing the linear combination of angular frequencies and the linear combination of phases. The analysis process comprises the following subroutines: 1) calculating the minimum potential energy of the harmonic oscillator for determining the available boundaries for this analysis process; 2) performing a second quantization on the harmonic oscillator to obtain a combination of creation operators and annihilation operators through ways corresponding for fermions, bosons, or mixed ones, (for the mixed ones, identifying fermions and bosons via making use of commutation and anti-commutation relations) thereby the combination is treated as an angular momentum feature; 3) performing a spectral analysis to find the ground state of the harmonic oscillator for determining whether the oscillator is in an applicable range; 4) performing an analysis on the oscillator with the Laplace transform to confirm the condition of convergence first and then converting the harmonic oscillator to a combination of angular frequencies and a combination of phases; 5) discarding the linear combination of angular frequencies which are perpendicular to each other; and 6) discarding a linear combination when the derived system energy is lower than the minimum potential energy of the oscillator. Finally, the optical path analysis unit U312 performs an optical-path analysis process for obtaining a polarization feature as a quantum spin property via analyzing the combination of the refractive index and the scattering angles within an optical path. The optical-path analysis process comprises the following steps: 1) expressing the combination of the refractive index and the scattering angles on a complex plane; 2)

converting the expression of the complex plane to a wave equation; 3) expressing the wave equation on the coordinate system of the electric field and the magnetic field; and 4) analyzing the directions of the electric field and the magnetic field so as to make the combination of the directions as a polarization feature. Thus, combining the above four elements (U309~U312) in an implementation of software, hardware, or a combination of software and hardware into a spin-property verification module M303 is capable of obtaining the quantum spin property with combinations of topological features, momentum features, and polarization features, so that the system is able to lock on a combination of the features of the quantum spin property as a pattern of a quantum system, and further to verify whether there is such a pattern in a quantum communication environment and an alert should be triggered. This is an effect that cannot be achieved by conventional technology.

Figure 7A:
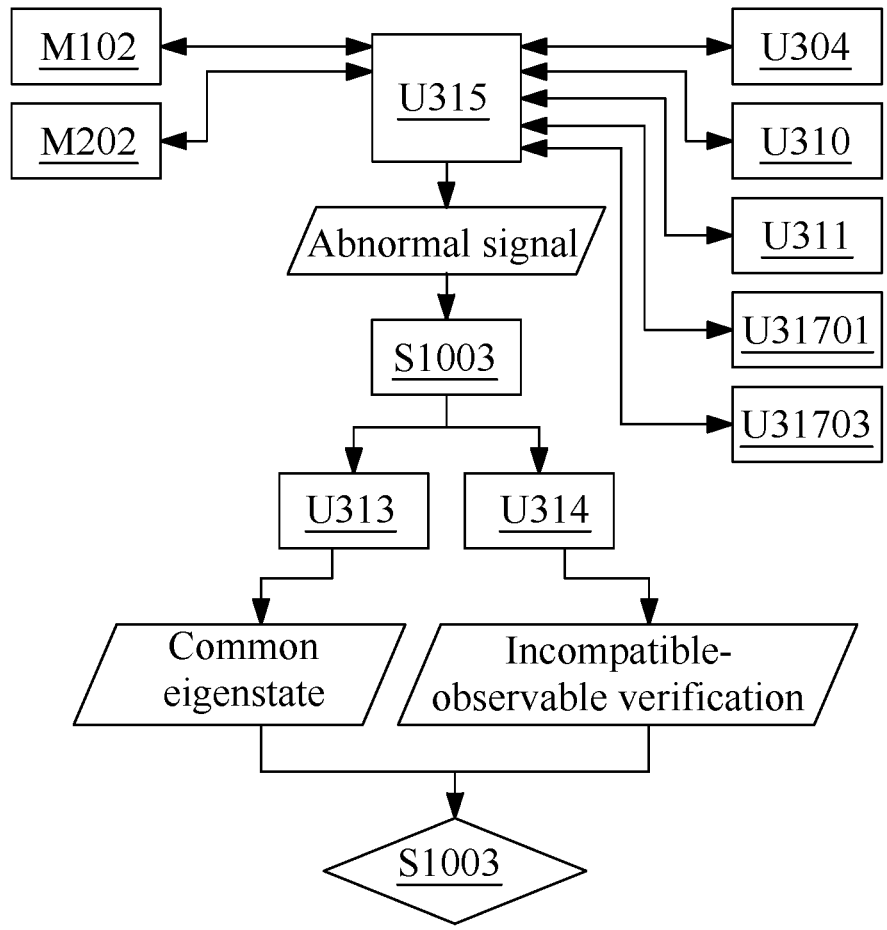
FIG. 7A is a dataflow diagram showing main data flow related to a quantum-computing-attack detection module according to an embodiment of the present invention.

Referring to FIG. 6, in an embodiment, in order to observe suspicious quantum behaviors through a total angular momentum operator $J^2$, an orbital angular momentum operator $L^2$, and a spin angular momentum operator $S^2$, the above-mentioned quantum-computing-attack detection module M304 of the third sub-system S1003 comprises: an angular-momentum complementary-observable measurement unit U313, an incompatible-observable verification unit U314, and an abnormal-variation detection unit U315. The angular-momentum complementary-observable measurement unit U313 performs a complementary-observable measurement process to measure the variation interval of the common eigenvalue of the Hamiltonian operator and the angular-momentum operator via making use of the commutation relations between the Hamiltonian operator and the angular-momentum operator, to derive the corresponding simultaneous eigenstate. The complementary-observable measurement process comprises the following steps: 1) finding the bases from the measured interval; 2) deriving a Clebsch-Gordan coefficient from the bases via making use of each spin quantum number; 3) repeating the above step for each spin quantum number such as j, l, s, and so on, to obtain a set of Clebsch-Gordan coefficients; 4) making the obtained Clebsch-Gordan coefficients as a C-G table and discarding unreasonable combinations; 5) finding the variation interval based on the derived Clebsch-Gordan coefficients according to the C-G table; 6) comparing the variation interval obtained from the C-G table with the measured variation interval for confirming the measured interval is applicable; 7) deriving the distribution of transition probability according to the measurements; and 8) making use of the derived distribution of transition probability and the derived C-G coefficients to determine whether the measurements are caused by L-L coupling for confirming whether the derived bases are applicable for a common eigenstate (discarding L-S coupling cases). Thereafter, the incompatible-observable verification unit U314 performs an incompatible-observable verification process to measure the Hamiltonian of a first quantum, and then to measure the angular momentum of a second quantum. If the product of the uncertainty for the observables of the first quantum and the second quantum cannot determine that the first quantum and the second quantum are incompatible observables with each other, that will determine that there is a common basis between the quantum states of the first quantum and the second quantum. The incompatible-observable verification process comprises the following steps: 1) confirming the two observables are complementary; 2) deriving the eigenstate of the two observables; 3) deriving the eigen value of the two observables; 4) confirming whether the product of the uncertainty for the observables of the first quantum and the second quantum cannot determine that the first quantum and the second quantum are incompatible observables with each other for extracting the common bases from the eigen state; 5) analyzing the common bases to determine whether there is degenerating issue; 6) performing a C.S.C.O. (complete set of commuting observables) operation to fix the degenerating issue if possible; 7) discarding the bases when the C.S.C.O. operation cannot fix the degenerating issue and there is no Hermitian operator for the bases as well; and 8) also confirming whether the common bases are corresponding to the bases of local quantum system to determine if there is any insider quantum attack that is usually a QAPT (quantum advanced persistent threat) case. In addition, the abnormal-variation detection unit U315 is in cooperation with other components to be capable of alerting abnormal quantum behaviors to the system, through monitoring system variations in a quantum communication environment. Refer to FIG. 7A which is a dataflow diagram for illustrating a mechanism with U314~U315. In an embodiment, the abnormal-variation detection unit U315 is in cooperation with the system wave-function analysis module M102, the fundamental-unit analysis module M202, the probability-of-excited-state analysis unit U304, the Pauli-vector analysis unit U310, the harmonic-oscillator analysis unit U311, the degenerate energy level analysis sub-unit U31701, and the Lamb-shift testing sub-unit U31703 to monitor the system variation in the quantum communication environment. Once U315 determines that there is an abnormal variation in the quantum system of a communication environment, an abnormal signal will be reported to the third sub-system S1003, and then S1003 works with the angular-momentum complementary-observable measurement unit U313 and the incompatible-observable verification unit U314 to determine whether there is a suspicious quantum behavior. Combining the above three elements (U313~U315) in an implementation of software, hardware, or a combination of software and hardware into a quantum-computing-attack detection module M304 is capable of determining whether there is a deformed quantum attack with a common basis same as a specific quantum state, through analyzing and observing physical quantity and angular momentum of a quantum system, so that a blocklist mechanism for quantum cyber security can be practiced. This is an effect that cannot be achieved by conventional technology.

Figure 7B:
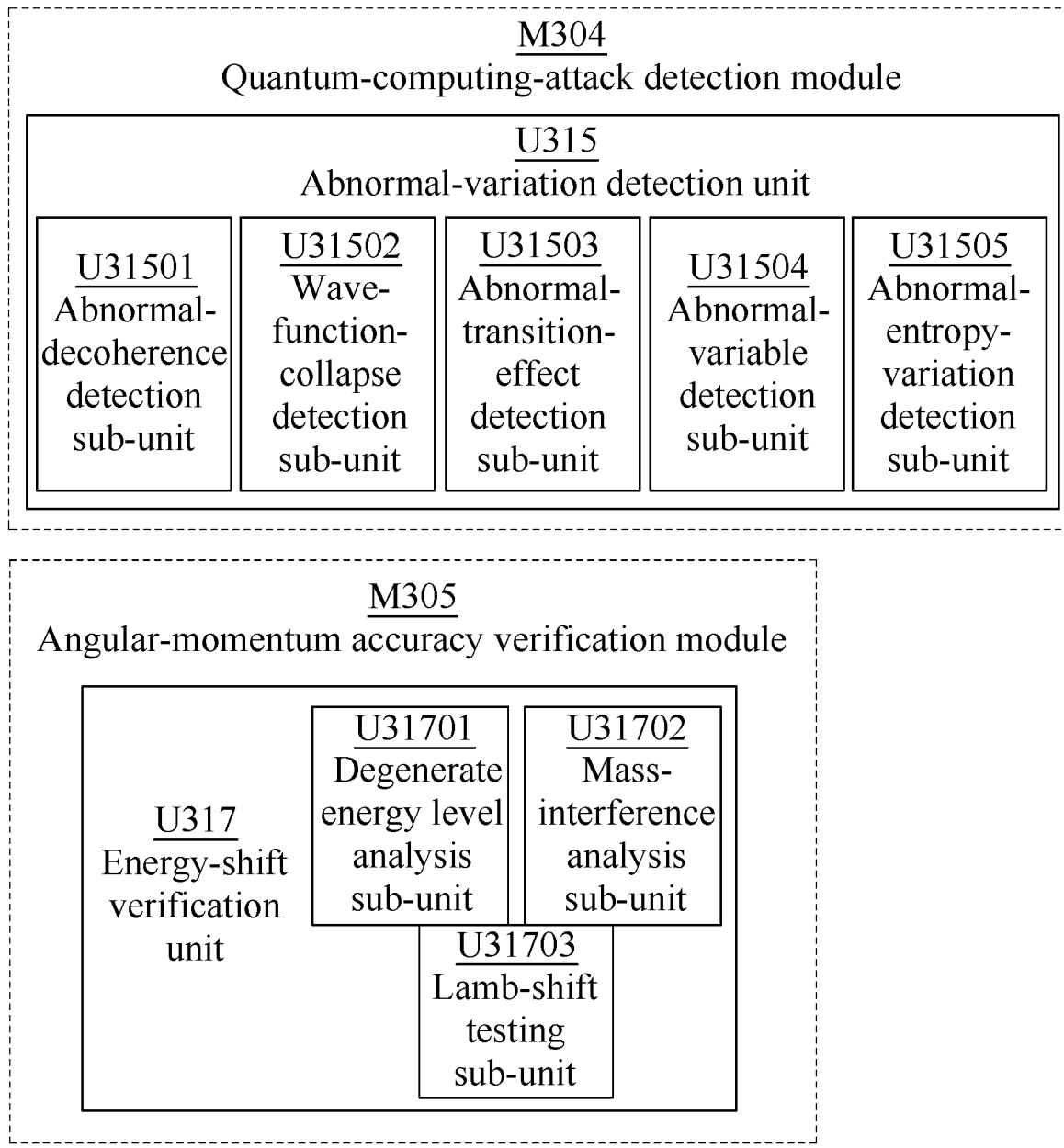
FIG. 7B is a block diagram of a quantum-computing-attack detection module according to an embodiment of the present invention.
Figure 8A:
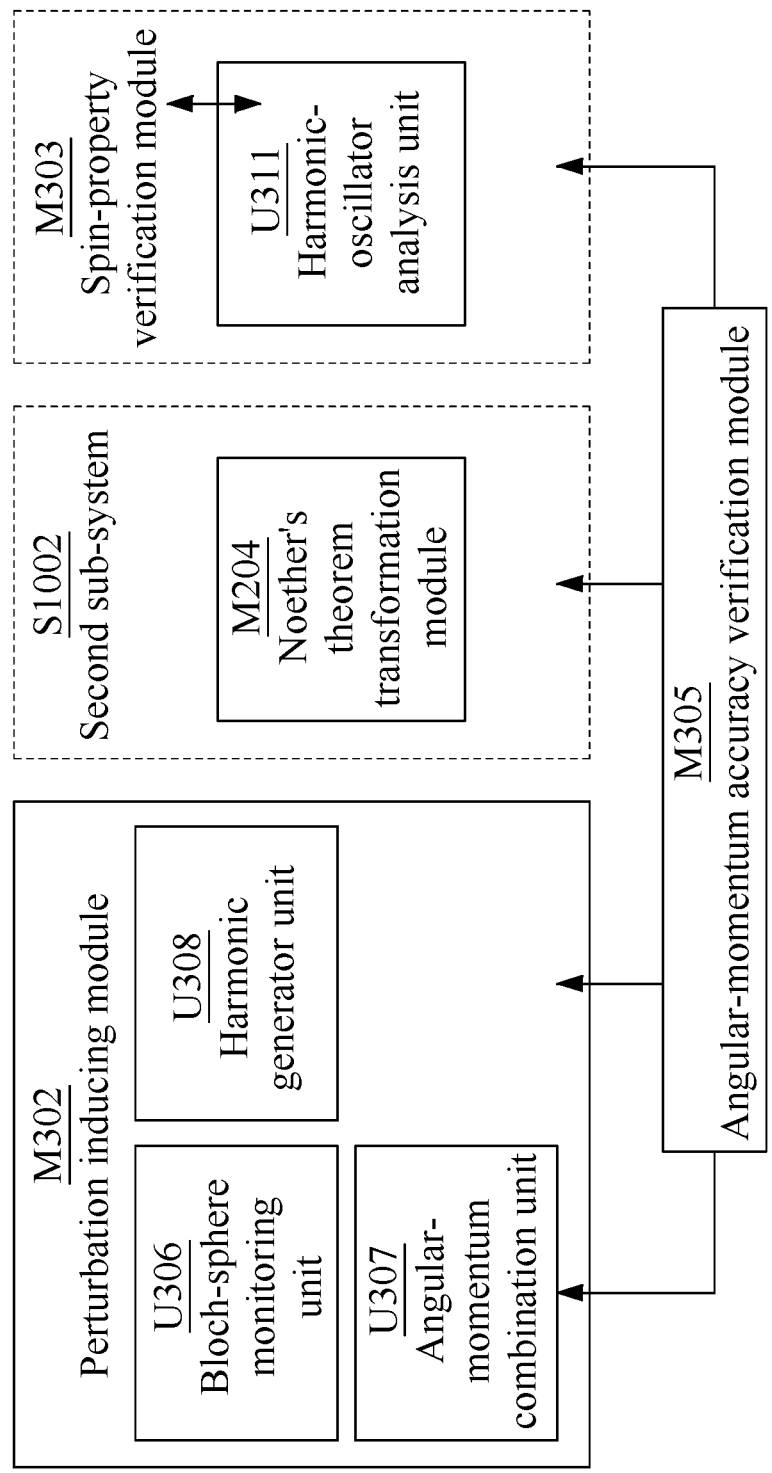
FIG. 8A is a block diagram showing main relations between the angular-momentum accuracy verification module and other elements according to an embodiment of the present invention.
Figure 8B:
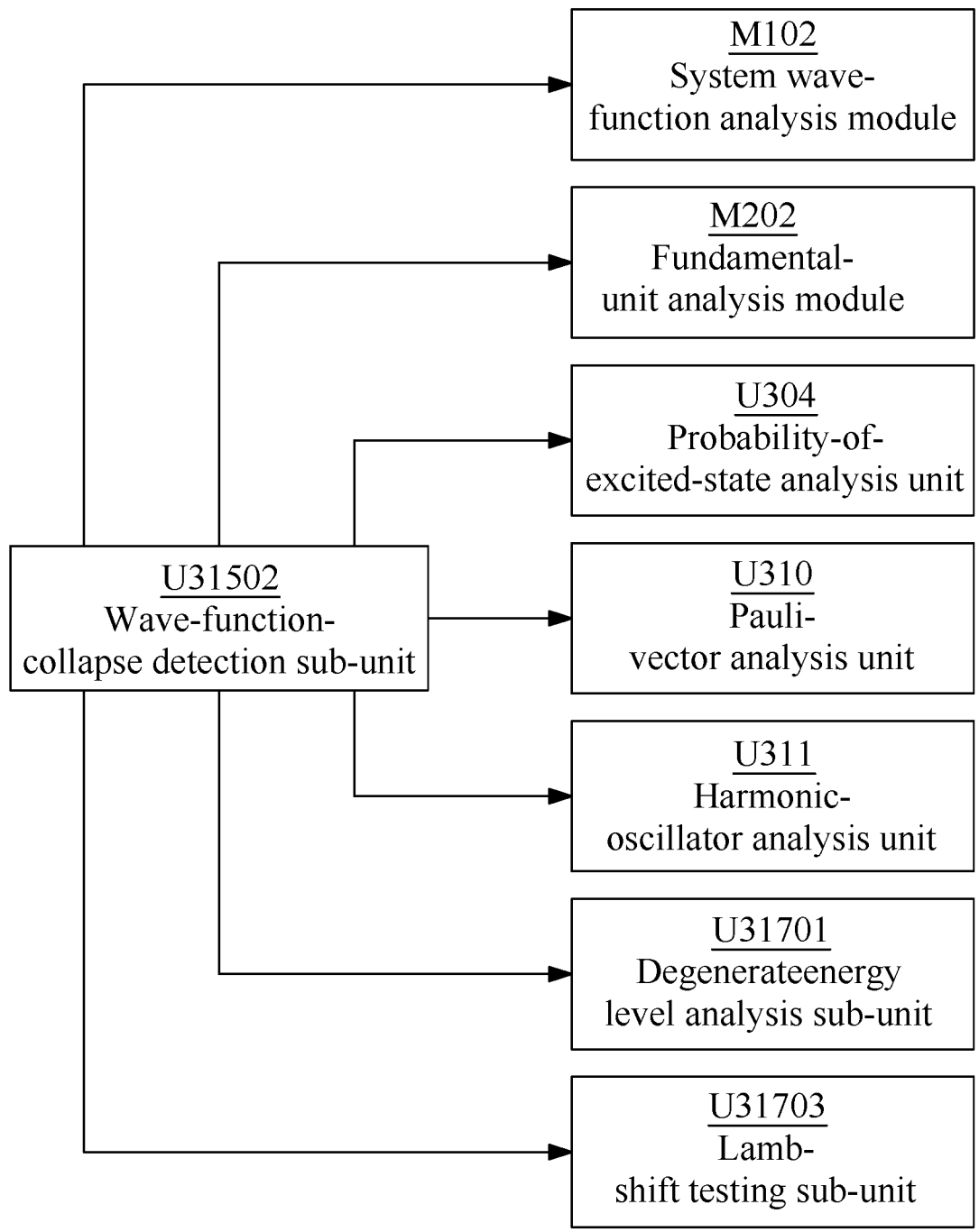
FIG. 8B is a block diagram showing main relations between the wave-function-collapse detection sub-unit and other elements according to an embodiment of the present invention.

In addition, referring to FIG. 7B, in an embodiment, in order to perform a counterattack according to an abnormal signal, to bypass an attack according to an abnormal signal, to block an attack according to an abnormal signal, to collect data of attacks with honeypots, to perform quantum key clearing or quantum key recycling for an abnormal event, to verify a result of quantum key storage for an abnormal event, or to perform a service migration for an abnormal event, the abnormal-variation detection unit U315 of the quantum-computing-attack detection module M304 comprises: abnormal-decoherence detection sub-unit U31501, a wave-function-collapse detection sub-unit U31502, an abnormal-transition-effect detection sub-unit U31503, an abnormal-variable detection sub-unit U31504, and an abnormal-entropy-variation detection sub-unit U31505. The abnormal-decoherence detection sub-unit U31501 determines whether the sub-unit U31501 should report to the third sub-system S1003 that an abnormal signal according to the rate of decoherence is detected in the quantum communication environment. Further, the wave-function-collapse detection sub-unit U31502 is coupled to a set of components for monitoring wave functions in a quantum communication environment, and reports an abnormal signal to the third sub-system S1003 when the phenomenon of wave-function collapse is detected. Referring to FIG. 8B, the set of components comprises: 1) the system wave-function analysis module M102 of the first sub-system S1001; 2) the fundamental-unit analysis module M202 of the second sub-system S1002; 3) the probability-of-excited-state analysis unit U304 of the third sub-system S1003; 4) the Pauli-vector analysis unit U310 of the third sub-system S1003; 5) the harmonic-oscillator analysis unit of the U311 third sub-system S1003; 6) the degenerate energy level analysis sub-unit U31701 of the third sub-system S1003; and 7) the Lamb-shift testing sub-unit U31703 of the third sub-system S1003. FIG. 8B shows an example that each sub-system is working with each other for most cases since the present invention provides a complete quantum cyber security mechanism with all of the three sub-systems (S1001~S1003). There are still more inter operations across sub-systems that can be found based on the description of the present invention. That means the third sub-system S1003 cannot work standalone without the second sub-system S1002 and the first sub-system S1001.

In an embodiment, referring to FIG. 7B again, the above-mentioned abnormal-transition-effect detection sub-unit U31503 compares the distribution of transition-effect probability detected in the quantum communication environment with the distribution of transition-effect probability estimated through the detected wave functions, and determines whether the sub-unit U31503 should report an abnormal signal to the third sub-system S1003 according to the comparison bias. Moreover, the abnormal-variable detection sub-unit U31504 introduces an analyzing process of the Einstein-Podolsky-Rosen paradox, and reports an abnormal signal to the third sub-system S1003 when a quantum physical behavior consisting with local realism and uncertainty principle are detected simultaneously. The analyzing process comprises the following steps: 1) introducing a Bell measurement to find a case which failed the measurement; 2) confirming the distribution of transition probability is reasonable for a case that failed the Bell measurement (that means a case with reasonable transition probability distribution but failed the Bell measurement); 3) discarding the case if it fits the Aharonov-Bohm effect (via checking the phase difference:

$$\Delta\phi = \frac{q}{\hbar c}\Phi_B);$$

4) discarding the case if it fits the Bohm diffusion (via checking Bohm scaling: $D=k_B T/eB$.); and 5) reporting an abnormal signal to the third sub-system S1003 if there is still a case after the above steps. Moreover, the abnormal-entropy-variation detection sub-unit U31505 performs a variation analyzing process to determine whether the sub-unit U31505 should report an abnormal signal to the third sub-system S1003 according to the variation of entropy detected in a quantum system connected to a communication environment. The variation analyzing process supports kinds of entropy as follows: von Neumann entropy, Shannon entropy, equilibrium entropy, and maximum entropy; in addition, the variation analyzing process further comprises the following steps: 1) making use of Boltzmann's entropy formula ($S=k_B \ln W$) with transition probability, entropy, and Boltzmann constant for estimating the variation of entropy; 2) discarding the case if the variation of entropy fits the principle of the increase of entropy; 3) performing a verification with Holevo's theorem for confirming the analyzed variation is out of Holevo's bound (the expression of Holevo's bound:

$$I(X:Y) \leq S(\rho) - \sum_i p_i S(\rho_i),$$

and an out-of-bound case is needed); and 4) introducing Lindblad's theorem (simulating with Lindblad master equation) for confirming that the analyzed variation is not caused by a non-equilibrium so that this sub-unit U31505 should report an abnormal signal to the third sub-system S1003. Combining the above five elements (U31501~U31505) in an implementation of software, hardware, or a combination of software and hardware into an abnormal-variation detection unit U315 is capable of alerting abnormal quantum behaviors to the system, through monitoring system variations in a quantum communication environment. Since the abnormal-variation detection unit U315 is further adopted by each sub-system, it enhances a key management mechanism with a complete alerting scheme in various key management phases. This is an effect that cannot be achieved by conventional technology.

In an embodiment, referring to FIG. 6, in order to avoid false-positive detections and false-negative detections, and to assure an effect of bypassing a quantum computing attack, and to identify normal and abnormal wave-function collapses, and to detect a local decay caused by external interferences, and to assure the accuracy of detection to transition probability, and to assure the accuracy for the subroutines in a Noether-theorem-transform process, the above-mentioned angular-momentum accuracy verification module M305 of the third sub-system S1003 comprises: a non-perturbed wave-function computing unit U316 and an energy-shift verification unit U317. The non-perturbed wave-function computing unit U316 performs a non-perturbed wave-function computing process to make use of the common eigen function of a non-perturbed Hamiltonian, square of a total angular momentum operator $J^2$, square of an orbital angular momentum operator $L^2$, and square of a spin angular momentum operator $S^2$ as a non-perturbed wave function to derive a first-order energy level shift. The non-perturbed wave-function computing process comprises the following steps: 1) deriving the expectation value of L and S; 2) deriving the energy level shift expression from the expectation value; 3) deriving the non-perturbed energy level shift based on the energy level shift expression; 4) deriving each energy level shift based on the energy level shift expression; 5) deriving the wave functions corresponding to each energy shift; 6) introducing Thomas precession $$\left(\omega_T = \frac{1}{c^2}\left(\frac{\gamma^2}{\gamma+1}\right)a \times v\right)$$

to the wave functions for correction to the spin-orbit interaction; 7) performing a verification with a first-order Stark effect (($(V_{int})_{kl} = \langle \psi_k^0|V_{int}|\psi_l^0\rangle = -F\cdot\langle \psi_k^0|\mu|\psi_l^0\rangle$, $E^{(1)} = -F\cdot\langle \psi_1^0|\mu|\psi_1^0\rangle = -F\cdot\langle \mu\rangle$) for confirming the corrected result is feasible; and 8) confirming that there is no degenerate state and no mass interferences with the corrected wave functions so as to extract the final first-order energy shift. Thereafter, the energy-shift verification unit performs an energy-shift verification process to compare the derived first-order energy level shift with the measured energy level bias to determine whether the accuracy of an estimated angular momentum is applicable. The energy-shift verification process comprises the following steps: 1) confirming the energy level shift is caused by a Stark effect or by Lamb shift (the Stark case is of interest); 2) deriving the angular frequency based on the measured energy level shift which is caused by a Stark effect; 3) deriving the angular momentum based on the angular frequency; 4) expressing the first-order energy level shift as a physical quantity through a Hamiltonian operator; 5) expressing the angular momentum with an observable operator; 6) performing a verification with Hermitian operator on the physical quantity; 7) calculating the bias between the physical quantity and the observable; and 8) tagging the result for further verifications when the derived bias is not acceptable.

Referring to an embodiment, combining the above two elements (U316~U317) in an implementation of software, hardware, or a combination of software and hardware into an angular-momentum accuracy verification module M305 is capable of improving the accuracy of the angular momentum estimation through implementing the perturbation theory. Also referring to FIG. 8A which is a block diagram showing main relations between the angular-momentum accuracy verification module M305 and other elements according to an embodiment of the present invention, M305 not only assures that an angular momentum is qualified enough to be used as an important intrinsic property of the system according to embodiments of the present invention, but also enhances the accuracy of angular momentum synthesis for the perturbation inducing module M302 of the third sub-system S1003. Moreover, it also enhances the accuracy of the derived conservation of the angular momentum when performing a Noether-theorem-transform process of the Noether's theorem transformation module M204 through the second sub-system S1002 according to embodiments of the present invention. In addition to accuracy concerns, this verification module M305 also facilitates a perturbation inducing process of the perturbation inducing module M302 to perform a correction term of a first energy level and a second energy level for a perturbation to a wave function, so as to assure that the energy level shift derived by a perturbation inducing process is qualified. Besides, the most important thing is that a non-qualified bias caused by an estimation of angular momentum may impact the determined result derived from the above-mentioned harmonic-oscillator analysis unit U311 of spin-property verification module M303, hence this module M305 plays a key role for maintaining an alerting scheme of the entire system as well. These are effects that cannot be achieved by conventional technology.

Referring to FIG. 7B, in some embodiments, in order to reduce the verification bias so as to enhance the management ability to the refractive index of an optical path and to be able to identify whether there is a quantum tunneling effect, the above-mentioned energy-shift verification unit U317 of the angular-momentum accuracy verification module M305 further comprises: a degenerate energy level analysis sub-unit U31701, a mass-interference analysis sub-unit U31702, and a Lamb-shift testing sub-unit U31703. The degenerate energy level analysis sub-unit U31701 performs an analysis process to determine whether the current energy level shift fits a degenerate state via analyzing the states of spin quantum numbers, wherein the analysis process comprises the following steps: 1) analyzing the energy level shift to obtain the quantum number of total angular momentum J; 2) obtaining measurements of $J^2$; 3) analyzing the energy level shift to obtain the spin magnetic quantum number $m_s$; 4) performing Bose-Einstein (B-E) statistics for discarding bosons; and 5) performing a verification on the obtained quantum numbers with the Pauli exclusion principle for determining whether there is degenerate state with the energy shift. Thereafter, the mass-interference analysis sub-unit U31702 analyzes mass resolution to determine whether there is mass interference with the current energy level shift. Finally, the Lamb-shift testing sub-unit U31703 adopts a testing process with Lamb-shift calculation analyzing energy level shift when the measured result of an energy level shift fits the condition of a degenerate state or a mass interference, in addition, this sub-unit is optionally applied for the measurement of Hawking radiation and quantum fluctuation, or for the identification of a quantum tunneling effect. The testing process comprises the following subroutines: 1) confirming that the splitting of the spectral lines corresponding to the energy level shift fits a fine structure; 2) introducing the kinetic energy relativistic correction term and the spin-orbit coupling correction term for correcting the non-perturbed Hamiltonian; 3) introducing the fine-structure constant α

$$\alpha\left(\alpha = \frac{e^2}{2\epsilon_0 hc}\right);$$

4) performing harmonic oscillator quantization for the electric field and magnetic field; 5) obtaining the zero-point energy from zero oscillation; 6) converting the zero-point energy to the form of the Lamb shift $$\begin{cases} \Delta E_{Lamb} = \alpha^5 m_c c^2 \frac{k(n, 0)}{4n^3} \text{ for } \ell = 0 \\ \Delta E_{Lamb} = \alpha^5 m_c c^2 \frac{1}{4n^3}\left[k(n, \ell) \pm \frac{1}{\pi\left(j + \frac{1}{2}\right)\left(\ell + \frac{1}{2}\right)}\right] \text{ for} \\ \ell \neq 0 \text{ and } j = \ell \pm \frac{1}{2}. \end{cases}$$

7) measuring the Lamb shift via making use of the Zeeman effect; 8) analyzing whether the measurement fits a normal Zeeman effect for confirming whether there is a degenerate state with the energy level shift (the fitting case is a degenerate case); and 9) analyzing whether the measurement fits an anomalous Zeeman effect via making use of total angular momentum J, orbital angular momentum L, spin angular momentum S, and the Landé g-factor $$\mu_J = g\frac{\varepsilon}{2m}J,$$

(J can be replaced with L, S, while m corresponds to particle mass), for confirming whether there is a decay caused by mass interference with the energy level shift (the fitting case is a mass-interference case). Combining the above three elements (U31701~U31703) in an implementation of software, hardware, or a combination of software and hardware into an energy-shift verification unit U317 is capable of maintaining the accuracy of angular momentum estimation even when the energy level shift is under the impact of degenerate states or mass interference. This is an effect that cannot be achieved by conventional technology.

Referring to FIG. 1, in some embodiments, in order to enhance the ability of a counterattack to the quantum computing attacks, the third sub-system S1003 further comprises: a replay-attack response module M307, a quantum random number generator module M308, a preimage attacking module M309, a second-preimage attacking module M310, and a collision attacking module M311. The replay-attack response module M307 performs a replay-attack-response process for responding to a replay attack launched by an attacker side. The replay-attack-response process comprises the following subroutines: 1) replying to the attacker side with forgery data; 2) adjusting the optical paths; 3) working with the perturbation inducing module M302 for bypassing the attack; 4) working with the honeypot construction module M301 for collecting data of attacks; 5) working with a second sub-system S1002 to perform quantum key clearing; and 6) requesting the third sub-system S1003 to perform quantum key recycling. In addition, the quantum random number generator module M308 derives a forgery hash value or a message digest. Moreover, the preimage attacking module M309 adopts a forgery hash value with true message digest to launch a preimage attack against the attacker side; and the second-preimage attacking module M310 hides the true hash function and modifies the length of a true message digest to launch a second-preimage attack against the attacker side. As for the collision attacking module M311, it performs a collision-attacking process to make use of the inverse function of the true hash function as the hash function, and the inverse element of the true message digest as the message digest, so as to launch a multi-collision attack against the attacker side. The collision-attacking process comprises the following subroutines: 1) coupling the honeypot construction module M301 for performing collision attacks; 2) driving collisions for cracking the wave functions, quantum keys, or hash functions, of other quantum systems; 3) capturing the common message digests between local system and other systems; 4) creating a rainbow table via making use of the hash functions collected from other quantum systems; 5) storing the quantum keys collected from other quantum systems into a database of patterns; 6) storing the wave functions collected from other quantum systems into a database of patterns; 7) making use of no-cloning theorem to extract the linear patterns of the quantum states collected from other quantum systems; and 8) searching for the mothership of an attacker group according to the collected linear patterns. Combining the above five elements (M307~M311) in an implementation of software, hardware, or a combination of software and hardware into the third sub-system S1003 helps to perform an effective counterattack mechanism against the attacker side when the attacker is trying to intercept the messages exchanged in the phases of quantum key storing, clearing, and recycling. Such combination further avoids cracking analysis from other quantum systems to the hand-shaking phases as well. In some embodiments, each sub-system adopts various combinations of these elements as different treatments to strike back in different phases of key management mechanism. These are effects that cannot be achieved by conventional technology.

Finally, referring to FIG. 1, in an embodiment, in order to work with the wave-function management module M101 and the system wave-function analysis module M102 of the first sub-system S1001 and the spin-property verification module M303, so as to enhance the ability of a counterattack to the quantum computing attacks, the third sub-system S1003 performs an attacking pre-processing program and further comprises a set of modules. The attacking pre-processing program comprises the following subroutines: 1) generating required quantum states; 2) making use of the quantum Zeno effect to keep the generated quantum states from decohering; 3) discarding the entangled quantum states; 4) discarding the quantum states of the local quantum system; 5) preventing reuse of the same quantum state in a specified time interval; 6) discarding the quantum states with wrong dimensions; and 7) discarding the quantum states generated with bases of other quantum systems. Further, the set of modules comprises: a forgery-key attacking module M312, a forgery-quantum-state attacking module M313, and a quantum DoS attacking module M314. Wherein, the forgery-key attacking module M312 delivers a forgery public key to the attacker side. Moreover, the forgery-quantum-state attacking module M313 is coupled to a set of components for producing a large number of forgery quantum states via making use of incorrect combinations of spin properties. The set of components comprises: 1) the angular momentum coupling unit (U103 shown in FIG. 3A) of the first sub-system S1001; 2) the spin-orbit coupling unit (U104 shown in FIG. 3A) of the first sub-system S1001; 3) the heavy-atom effect activation unit (U105 shown in FIG. 3A) of the first sub-system S1001; 4) the coupling constant derivation unit (U106 shown in FIG. 3A) of the first sub-system S1001; 5) the spin-property verification module M303 of the third sub-system S1003; 6) the incompatible-observable verification unit (U314 shown in FIG. 6) of the third sub-system S1003; and 7) the angular-momentum accuracy verification module M305 of the third sub-system S1003. In the end, the quantum DoS attacking module makes a large number of quantum states be decohered in other quantum systems via controlling the temperature of other quantum systems (for example, accessing the attacker side with a continuous high-frequency light wave). Combining the above three elements (M312~M314) in an implementation of software, hardware, or a combination of software and hardware into the third sub-system S1003 helps to perform an effective counterattack mechanism against QAPT (quantum advanced persistent threat) from other quantum systems in the phases of quantum key storing, clearing, and recycling. Such combination is further capable of rapidly consuming system resources on the attacker side, so that it paralyzes the attacker's limited computing force due to cost considerations. These are effects that cannot be achieved by conventional technology.

Thereby, the above embodiments of the present invention support to implement a system for use in a key management mechanism to resist quantum computing attacks in different key management phases such as quantum key storage, quantum key clearing, and quantum key recycling. The present invention provides a complete architecture of quantum computing attack resistance for general quantum key management systems (KMS) or key distribution centers (KDC). This technology can be implemented as a high-strength quantum-attack-resistant key management device or system, and can be implemented on a server side or a cloud service platform. In some embodiments, this technology not only detects and avoids quantum attacks, but also optionally implements basic or advanced counterattacking modules (such as M312~M314 shown in FIG. 1 for advanced counterattacks). In addition, the relevant technical means of this system can be practiced by devices at a reasonable cost, effectively overcoming the bottleneck of most current PQC schemes that must be operated through high-cost equipment, and also provides several effects of a cyber-security mechanism that cannot be supported by the current PQC schemes for use in a key management system.

While the present disclosure has been described by means of specific embodiments, numerous modifications and variations could be made thereto by those skilled in the art without departing from the scope and spirit of the present disclosure set forth in the claims.

What is claimed is:

1. A quantum-attack resistant operating system for use in a key management mechanism comprising at least a first sub-system, and the first sub-system resists quantum computing attacks during a procedure of quantum key storage, wherein the first sub-system at least comprises:
   a wave-function management module for modifying a wave function via making use of a Schrödinger equation with momentum adjustment;
   a system wave-function analysis module for analyzing the wave functions through operations of Born-Oppenheimer approximation, while the wave functions are adopted by quantum behaviors, mechanisms, approaches, or apparatuses of other systems, in a communication environment with an optical path of quantum steering; and
   a shielding & shielding-resistance module for preventing processes and operations related to a quantum key in storage from being detected or blockaded by an outside quantum computing system, wherein the shielding & shielding-resistance module comprises:
      an angular momentum coupling unit which performs a pre-process for spin-pairing and a process for angular momentum coupling to obtain required spin angular momentum that is the same as the spin angular momentum of other systems;
      a spin-orbit coupling unit which performs a j-j coupling process to couple an orbit and the spin angular momentum;
      a heavy-atom effect activation unit for triggering a transition effect through enhancing the coupling effect of spin-orbit;
      a coupling constant derivation unit for deriving a coupling constant via calculating an incidence rate of the transition effect; and
      a scale of kinetic energy mapping unit which creates a mapping data of the coupling constant and the scale of kinetic energy according to the relations between a coupling constant and the scale of kinetic energy.

2. The quantum-attack resistant operating system for use in a key management mechanism according to claim 1, comprising at least a second sub-system, and the second sub-system resists quantum computing attacks during a procedure of quantum key clearing; in order to adjust a refractive index of an optical path based on a kinetic-energy term, wherein the second sub-system at least comprises:
   a Euler-Lagrange variation module which performs calculus of variations for time and optical path, and then derives a stationary value of least action through Euler-Lagrange's first equation with functional analysis;
   a fundamental-unit analysis module, which converts the least action to a description related to momentum through fundamental units; and
   a Hamiltonian system transformation module, which converts the description related to momentum to a generalized momentum in a Symplectic manifold and derives a kinetic-energy term through the quadratic form of the generalized momentum.

3. The quantum-attack resistant operating system for use in a key management mechanism according to claim 2, comprising at least a third sub-system, and the third sub-system resists quantum computing attacks during a procedure of quantum key recycling, wherein the third sub-system comprises a plurality of the following modules:
   a honeypot construction module which constructs a specific honeypot to prevent the system from being attacked by other quantum operations during a quantum key recycling procedure, wherein the honeypot construction module comprises:
      a multi-microwaves generator unit which can operate with photons to activate various transition effects through a plurality of microwave generators with different resonance frequencies;
      a potential-well control unit which controls energy-level shift via scattering processes and perturbation processes, so as to control the probability range of transition effect;
      an angular-frequency combination unit which applies Fermi's golden rule on the transition effect of discrete energy level for deriving a density of state based on required angular frequency, and then uses a plurality of Born approximation processes based on scattering theory to derive corresponding scattering cross-sections and incident angles, so as to combine a plurality of angular frequencies as a spin attribute;
      a probability-of-excited-state analysis unit which analyzes the probability of excited state according to the photoelectric effects measured from a high energy level to a low energy level for determining whether a potential well needs tuning; and
      a single-frequency harmonic analysis unit which expresses the prepared angular frequency as a single-frequency harmonic, and compares the harmonic with the measured distribution of transition probability to determine whether the prepared angular frequency is applicable; and
   a perturbation inducing module which performs a perturbation inducing process based on the result with various bases derived from the honeypot construction module, so as to bypass or remove quantum computing attacks during the quantum key recycling procedures, wherein the perturbation inducing module comprises:
      a Bloch-sphere monitoring unit for monitoring quantum operation behaviors caused by a non-native system;
      an angular-momentum combination unit which combines different angular frequencies via making use of the honeypot construction module as a required angular momentum according to the monitored result derived by the Bloch-sphere monitoring unit; and
      a harmonic generator unit which generates a harmonic corresponding to the required angular momentum, wherein the harmonic generator unit induces artificial atoms to shift via a perturbation process, so as to bypass or remove the quantum computing attacks from other systems.

4. The quantum-attack resistant operating system for use in a key management mechanism according to claim 3, in order to implement ability of disrupting other quantum systems, wherein the third sub-system for resisting quantum computing attacks further comprises:
   a spin-property verification module which derives a topology attribute, a momentum attribute, and a polarization attribute of the spin property for a quantum via an eigenization process, so as to analyze whether a quantum owns a specific spin property;

a quantum-computing-attack detection module for analyzing a deformed quantum computing attack to derive common bases and variation intervals for working with the spin-property verification module so as to further lock on malicious quantum behaviors;

an angular-momentum accuracy verification module which provides a verification computing process with perturbation theory, wherein the process is based on an angular momentum estimated by a sub-system to be compared with an angular momentum from another system, for at least one of the first sub-system, the second sub-system, and the third sub-system; and a plurality of anyon control modules which is configured to control and adjust angular momentum to repeatedly change spin orbit to generate various wave functions via making use of an anyon two-dimensional model, so as to disrupt quantum operations from other systems.

5. The quantum-attack resistant operating system for use in a key management mechanism according to claim 4, in order to promptly estimate a system wave function for an unknown quantum system via making use of Born-Oppenheimer approximation with matrices operations for a nuclear wave function, wherein the system wave-function analysis module of the first sub-system comprises:

a Slater-determinant computing sub-unit which transforms a plurality of results of wave-function measurements into a form of Slater determinant with bases, via a data pre-processing program and a normalizing process with eigenvectors and eigenvalues, where the data pre-processing program comprises steps of missing data handling, outlier handling, and duplicate-data handling;

a Pauli-matrices converting sub-unit which performs a pre-processing program and a converting process for converting a Slater determinant into a form of a plurality of Pauli matrices to express a plurality of observations, where the pre-processing program comprises the processes of a Hartree method process with a Hartree product, a linear dependence filtering process, an order rationality verification process with wedge product operations, a fermion filtering process, a verification process with Hund's rule of maximum multiplicity, a degenerate state filtering process with Hund's rules, a filtering process with the Tolman-Oppenheimer-Volkoff equation via the Schwarzschild metric with the Reissner-Nordström metric, the Kerr metric or the Kerr-Newman metric for filtering micro substances with artificial gravity and strong magnetic fields, a filtering process based on electron degeneracy pressure, a filtering process via making use of the Zeeman effect, a non-identical particle filtering process, an incompatible observable filtering process, a second-quantization observable filtering process, and an angular-momentum-coupled observable filtering process based on Clebsch-Gordan coefficients;

a Born-rule computing sub-unit for deriving transition probability corresponding to each observation via making use of the Born rule;

a Franck-Condon principle analysis sub-unit which performs a pre-processing program to derive a quantum harmonic oscillator function, and analyzes the derived transition probability with the derived quantum harmonic oscillator function via making use of the Franck-Condon principle of quantum mechanics, so as to derive a distribution of the transition probability and the approximate solution of a quantum wave function and a nuclear wave function, wherein the pre-processing program comprises the following steps:

finding zero-point energy from zero oscillations to derive the ground state of a wave function;

performing nondimensionalization for the wave function corresponding to the derived ground state to obtain an approximate solution for the quantum wave function;

repeating the above step to find a plurality of ground states for the available zero oscillations to obtain a plurality of wave functions;

coupling the available wave functions as a quantum harmonic oscillator;

performing a quasi-particle filtering process;

performing a one-dimensional harmonic oscillator filtering process;

performing a resolution process for a time-independent Schrodinger equation derived from an eigenstate so as to derive a nuclear wave function;

performing nondimensionalization for the derived nuclear wave function to obtain an approximate solution of the nuclear wave function; and a Born-Oppenheimer approximation computing sub-unit which performs a pre-processing program and a Born-Oppenheimer approximation process based on the approximate solutions of the particle wave function and the nuclei wave function to obtain an approximate solution of a system wave function, and then performs a post-processing program, wherein the pre-processing program comprises the following subroutines:

confirming that the nuclei is much heavier than electrons;

making use of the Franck-Condon factor for confirming that the value of extinction coefficient is in a valid range;

performing a phonon filtering subroutine; and confirming that the transition dipole surface fits the condition of Condon approximation; and and the Born-Oppenheimer (BO) approximation process comprises the following steps:

expressing the system Hamiltonian with a nuclear kinetic energy operator and an electron Hamiltonian;

introducing the electron Hamiltonian into an electronic Schrodinger equation for deriving electronic wave functions and a potential energy surface;

making use of density functional theory on the electronic Schrodinger equation to obtain the potential energy surface (PES);

performing a validation subroutine to confirm that the electronic state is sufficiently separated from other electronic states;

performing another validation subroutine with the Born rule for the transition probability derived from the obtained PES;

dropping the points near conical intersections on the PES;

performing BO approximation on the processed PES to derive an approximate solution of the system wave function;

performing a symmetry and asymmetry validation process on the derived harmonic oscillator wave function; and performing a verification process on the derived approximate solution with the angular-momentum accuracy verification module of the third sub-system;

and the post-processing program comprises the following subroutines:
  monitoring the variation of the wave functions estimated by the above approximations;
  finding linear combinations of the wave functions through superposition principle;
  expressing the wave functions into the form of a Bloch sphere;
  combining the Bloch-sphere expressions and the linear combination of wave functions as attributes of a quantum system;
  introducing a time variant term to the Schrodinger equation for predicting a decoherence status;
  correcting the approximate solution according to the interference caused by the variation of temperature in the quantum system;
  storing the combined attributes into a database;
  configuring patterns composed of the attributes stored in the database for cyber firewalls;
  performing an identification process with the database for identifying the attacker group;
  configuring patterns composed of the attributes stored in the database as a blocklist/allowlist for quantum communication;
  performing a quantum interfering process to the attacker side with the wave functions stored in the database;
  performing a history analyzing process on the database for predicting malicious behaviors from the attacker side;
  receiving instructions from a honeypot construction module for sharing the database;
  performing a von-Neumann-entropy analyzing process on the stored approximate solutions for creating additional patterns for a quantum system;
  performing a second-quantization identification process on the stored approximate solutions functions for identifying a wave function made by second-quantization operation;
  performing another identification process on the stored approximate solutions functions for identifying a wave function which cannot be analyzed by a functional analysis process or is operated with excited-state;
  performing another identification process on the stored approximate solutions for identifying a slow-varying wave function;
  performing another identification process on the stored approximate solutions for identifying a fast-varying wave function;
  creating additional patterns with the combination of results of wave-function measurements;
  performing a regression process on the results of wave-function measurements;
  performing a non-linear PCA process on the results of wave-function measurements;
  performing an analyzing process with Chaos models for the results of wave-function measurements with time-variant feature; and
  performing an artificial intelligence (A.I.) analyzing process on the results of the wave-function measurements.

6. The quantum-attack resistant operating system for use in a key management mechanism according to claim 5, in order to enhance the measurement ability to quantum computing attacks and suspicious quantum behaviors, and enhance the ability of pattern extraction coupled to the Born-Oppenheimer approximation computing sub-unit of the system wave-function analysis module, meanwhile to promptly resist a quantum computing attack and to provide the ability of history tracing, the system wave-function analysis module of the first sub-system further comprises the following sub-units and there is a pre-processing program before performing the following sub-units and there is also a post-processing program after performing the following sub-units, wherein the pre-processing program is to drop the measurements with degenerate states, and the post-process program comprises the following subroutines:
  performing a verification process with the angular-momentum accuracy verification module of the third sub-system;
  dropping the computing result derived from an approximation computing process and performing a measurements processing program for pattern extraction without approximation when the computing result cannot pass the above verification process successfully;
  dropping the computing result and performing a measurements processing program for pattern extraction without approximation when the computing result derived from an approximation cannot tend to convergence;
  dropping the computing result and performing a measurements processing program for pattern extraction without approximation when a WKB computing failed in an asymptotic expansion;
  dropping the computing result and performing a measurements processing program for pattern extraction without approximation when a WKB computing processes a ground state of many-particle system; and
  tagging a malicious label on the measurements which cannot be analyzed or post-processed by the system wave-function analysis module;
and the sub-units working with the above pre-process program and the post-process program are as follows:
  a second-quantization measurement sub-unit for measuring a harmonic-oscillator attack launched through a second quantization;
  a GW approximation (GWA) computing sub-unit with the ability of GWA and perturbation computing for measuring excited-state attacks, or a quantum attack on which functional analysis cannot be performed;
  a WKB approximation computing sub-unit for measuring quantum attacks of a slow-varying wave function; and
  a calculus-of-variations computing sub-unit which performs a calculus-of-variations computing process for measuring quantum attacks of fast-varying wave function via using calculus of variations of functional analysis, wherein the calculus-of-variations computing process comprises the following subroutines:
    confirming whether there is an extremum to the measurement;
    confirming that the data of measurements can be expressed as a curve with a set of equations;
    confirming that the expressed curve is continuously differentiable;
    confirming that the dimension of the measurements is reasonable;
    finding the critical points in the domain of the expressed curve so as to determine the boundary for the calculus operations; and
    performing calculus-of-variations computing operations on the expressed curve.

7. The quantum-attack resistant operating system for use in a key management mechanism according to claim 1 or 5, for the cases requiring the Born-Oppenheimer approximation, in order to express an initial equilibrium state with bases derived from a plurality of wave-function measurements for use in a Born-Oppenheimer approximation computing process in the condition of zero-point energy, so as to facilitate the operations of the Born-Oppenheimer approximation, thereby to perform pattern-extraction from the derived initial equilibrium states for analyzing whether there is a common source for the measured wave functions, wherein the Born-Oppenheimer approximation computing sub-unit of the system wave-function analysis module of the first sub-system further comprises:

a projection operation sub-module which estimates a linear combination of qubits for a measured quantum system via making use of projection operators;

a Fock-space switching sub-module which performs a Fock-space switching process to express a linear combination of qubits as a quantum system state via making use of a singular-integral operator of a Fock space, wherein the Fock-space switching process comprises the following subroutines:
normalizing the linear combination of qubits;
finding the bases represented to various Hilbert spaces;
expressing the linear combination of bases in a form of Fock space;
performing Fock-space operations via making use of norm, tensor product, inner product, direct sum, and complex scalar to obtain Fock states;
performing a filter to drop the linear combination if there is a Fock state represented to a combination of fermions and bosons; and
performing a singular-integral operation on the Fock space to obtain states of a quantum system;

a Hilbert-space switching sub-module which performs a pre-processing program and a Hilbert-space switching process to switch quantum system state of a Fock space into a form of multi-dimensional Hilbert space, wherein the pre-processing program comprises the following steps:
selecting the corresponding orthogonal bases in a Hilbert space according to the quantum system state of a Fock space;
performing projection operations with projection operator and the orthogonal bases for the quantum system state;
performing unitary transformation on the projected quantum system state;
deriving wave functions according to the corresponding bases from the transformed quantum system state;
performing eigenization on the derived wave functions to derive eigenvalue and eigenvectors;
and the Hilbert-space switching process comprises the following steps:
converting the eigenized result derived from the pre-processing program into a complex Hilbert space to express the eigenstate with a plane-wave term and a bound-state term;
handling to extract the bound states from the complex Hilbert space;
simulating the bound state with a combination of harmonic oscillators to derive corresponding harmonic wave functions according to the bound states;
handling the harmonic wave function with spectral method to derive an energy-level equation that helps to obtain the corresponding energy spectrum of a harmonic wave function;
adopting a Hilbert-Schmidt operator as an identity operator to perform dimension verification for the harmonic wave functions to confirm whether the above transformation is successful; and
performing inner-product operations on the harmonic wave functions for discarding the wave functions of local system to assure that the current quantum system states are from other systems;

a second-quantization sub-module which performs a second-quantization process on a quantum system state of Hilbert space via making use of creation and annihilation operators, and the result of the second-quantization process is for describing the Hamiltonian of the quantum system;

a plurality of Fourier-transform sub-module that each performs Fourier transform on a Hamiltonian of a quantum system to eliminate the uncertainty of the physical quantity of position and the uncertainty of the physical quantity of momentum, and then performs a verification with Parseval's theorem to confirm the transformed result is correct, and thereby obtains two kinds of transformed system physical quantities;

a functional analysis sub-module which performs functional analysis on the determined transformed system physical quantities, to obtain a probability distribution via making use of the calculus-of-variations method, and to derive energy states via making use of a Bessel function, thereby to extract more features of a wave function;

a standardization operation sub-module which performs a standardization operation on a probability distribution;

a sample-mean computing sub-module which estimates a sample mean and a set of moments with various moment ordinal, based on a standardized probability distribution in a sample space, in addition, the sub-module also provides linear combinations of various estimated values of a plurality of particles, meanwhile analyzes the sum of probability in a sample space and performs a Markov process to verify whether a linear combination of the probability distribution is continuous and random; and a Schrödinger-equation transformation sub-module which expresses the quantum system state as a time-dependent Schrodinger equation based on the estimated sample mean, moments, standardized probability distribution, and the determined converted system physical measurements, so as to derive the initial equilibrium state required for a Born-Oppenheimer approximation.

8. The quantum-attack resistant operating system for use in a key management mechanism according to claim 5, in order to implement the management ability to refractive index of an optical path via breaking the conservation of angular momentum based on the kinetic-energy term derived from the Hamiltonian system transformation module of the second sub-system, so as to bypass quantum computing attacks and suspicious quantum behaviors, to prevent from being detected via quantum teleportation, and to perform fake responses through quantum transmission within optical paths, wherein the second sub-system further comprises:

a Noether's theorem transformation module which performs a Noether-theorem-transform process to transform a kinetic-energy term to a conserved quantity of angular momentum with general global symmetry via making use of Noether's theorem, wherein the Noether-theorem-transform process comprises the following subroutines:
performing a verification for invariant of the kinetic-energy term;
performing a verification for conservatism of time variation;
confirming that the measurements of the kinetic energy meets Heisenberg's uncertainty principle;
expressing the derived physical quantity with a Hamiltonian operator and expressing the obtained measurements with an observable operator;
extracting a Hermitian operator of the Hamiltonian operator for verifying that the obtained physical quantity and measurements fit a continuity equation;
converting the continuity equation as a Noether current for expressing a flow of conserved quantity;
performing a space-like slicing operation on the Noether current for integrating the current over a space-like slice so as to obtain the Noether charge as a conserved quantity, wherein the space-like slicing operation comprises the following subroutines:
confirming the interval of a period;
switching the current coordinate system to a smooth coordinate system;
confirming there is an orthonormal basis in the switched system space;
confirming there is convexity in the system space; and
slicing the system space with $L^p$ space (Lebesgue spaces) letting $p \geq 1$;
and transforming the conserved quantity derived from the kinetic energy to a conserved quantity of angular momentum;
a Hartree-Fock-equation computing module which performs a Hartree-Fock-equation computing process to calculate the minimum required kinetic energy for breaking conservation via making use of Hartree-Fock equation, wherein the Hartree-Fock-equation computing process comprises the following steps:
expressing a conserved quantity of angular momentum with a Slater determinant;
performing central force field approximation on the Slater determinant to obtain molecular orbital wave function;
performing calculus of variations on the molecular orbital wave function to obtain a one-electron orbital wave function;
resolving the one-electron orbital wave function to obtain a solution; and
extracting the minimum required kinetic energy from the obtained solution;
an angular frequency management module which manages to tune the angular frequency based on the minimum required kinetic energy;
a phase management module which manages to tune the phase based on the minimum required kinetic energy; and
an adjustable grating module which performs a pre-processing program and then introduces the light wave that has completed the angular-frequency tuning process and the phase tuning process into a grating element implemented with electro-optic crystals, so as to derive the desired change in refractive index due to breaking the conservation of angular momentum, wherein the pre-processing program coupled to a Bragg grating comprises the following subroutines:

analyzing the received wave packets to determine whether there is a dispersion issue;
determining whether there is a diffraction issue;
determining whether there is a scattering issue;
eliminating electromagnetic interference;
confirming the resolution for the Bragg grating;
confirming the refractive index for the Bragg grating; and
introducing the light wave through the Bragg grating to the grating element implemented with electro-optic crystals.

9. The quantum-attack resistant operating system for use in a key management mechanism according to claim 6 or 8, wherein the spin-property verification module of the third sub-system comprises:
a projection quantum number analysis unit for obtaining the spin projection quantum number of multiplicity via an analysis process, wherein the analysis process comprises the following subroutines:
performing projection measurement of spin along an arbitrary axis;
verifying the compatibility of spin measurements;
performing a verification based on spin-statistics theorem to confirm the rationality of related spin quantum numbers;
calculating the related spin quantum numbers of a quantum system;
performing a classification method based on the spin quantum numbers; and
performing a plurality of measurements for verifying the rationality of the probability distribution;
a Pauli-vector analysis unit which performs an analysis process for obtaining a complex plane coordinate to be a topological invariant as a quantum spin property via making use of a Pauli vector and Euler's formula, based on the spin projection quantum number of multiplicity, wherein the analysis process comprises the following steps:
performing a verification of symmetry on the spin quantum numbers for discarding the spin quantum numbers with a specific combination of symmetry and asymmetry;
performing complex analysis on the projection measurements and discarding the measurement which cannot satisfy Euler's identity;
performing complex analysis to express a corresponding Euler's formula as a cis function;
extracting the combination of parities (odds and evens) from the Pauli vector corresponding to the spin charges so as to form an attribute or feature for a quantum system; and
combining the results of the above steps as a kind of topological invariant as a quantum spin property;
a harmonic-oscillator analysis unit which performs an analysis process on a quantum harmonic oscillator derived from the system wave-function analysis module of the first sub-system for obtaining a momentum feature as a quantum spin property via analyzing the linear combination of angular frequencies and the linear combination of phases, wherein the analysis process comprises the following subroutines:
calculating the minimum potential energy of the harmonic oscillator for determining the available boundaries for this analysis process;
performing second quantization on the harmonic oscillator to obtain a combination of creation operators and annihilation operators through ways corresponding for fermions, bosons, or mixed ones, thereby the combination is treated as an angular momentum feature;
performing a spectral analysis to find the ground state of the harmonic oscillator for determining whether the oscillator is in an applicable range;
performing an analysis on the oscillator with Laplace transform to confirm the condition of convergence first and then converting the harmonic oscillator to a combination of angular frequencies and a combination of phases;
discarding the linear combination of angular frequencies which are perpendicular to each other; and
discarding a linear combination when the derived system energy is lower than the minimum potential energy of the oscillator; and
an optical path analysis unit which performs an optical-path analysis process for obtaining a polarization feature as a quantum spin property via analyzing the combination of the refractive index and the scattering angles within an optical path, wherein the optical-path analysis process comprises the following steps:
expressing the combination of the refractive index and the scattering angles on a complex plane;
converting the expression of the complex plane to a wave equation;
expressing the wave equation on the coordinate system of electric field and magnetic field; and
analyzing the directions of electric field and magnetic field so as to make the combination of the directions as a polarization feature.

10. The quantum-attack resistant operating system for use in a key management mechanism according to claim 6 or 8, in order to observe suspicious quantum behaviors through a total angular momentum operator $J^2$, an orbital angular momentum operator $L^2$, and a spin angular momentum operator $S^2$, wherein the quantum-computing-attack detection module of the third sub-system comprises:
an angular-momentum complementary-observable measurement unit which performs a complementary-observable measurement process to measure the variation interval of the common eigenvalue of the Hamiltonian operator and the angular-momentum operator via making use of the commutation relations between the Hamiltonian operator and the angular-momentum operator, to derive the corresponding simultaneous eigenstate, wherein the complementary-observable measurement process comprises the following steps:
finding the bases from the measured interval;
deriving a Clebsch-Gordan coefficient from the bases via making use of each spin quantum number;
repeating the above step for each spin quantum number such as j, 1, and s, to obtain a set of Clebsch-Gordan coefficients;
making the obtained Clebsch-Gordan coefficients as a C-G table and discarding unreasonable combinations;
finding the variation interval based on the derived Clebsch-Gordan coefficients according to the C-G table;
comparing the variation interval obtained from the C-G table with the measured variation interval for confirming the measured interval is applicable;
deriving the distribution of transition probability according to the measurements; and
making use of the derived distribution of transition probability and the derived C-G coefficients to determine whether the measurements are caused by L-L coupling for confirming whether the derived bases are applicable for a common eigenstate;
an incompatible-observable verification unit, which performs an incompatible-observable verification process to measure the Hamiltonian of a first quantum, and then to measure the angular momentum of a second quantum, thereby if the product of the uncertainty for the observables of the first quantum and the second quantum cannot determine that the first quantum and the second quantum are incompatible observables with each other, that will determine that there is common basis between the quantum states of the first quantum and the second quantum, wherein the incompatible-observable verification process comprises the following steps:
confirming the two observables are complementary;
deriving the eigenstate of the two observables;
deriving the eigen value of the two observables;
confirming whether the product of the uncertainty for the observables of the first quantum and the second quantum cannot determine that the first quantum and the second quantum are incompatible observables with each other for extracting the common bases from the eigen state;
analyzing the common bases to determine whether there is degenerating issue;
performing a complete set of commuting observables (C.S.C.O.) operation to fix the degenerating issue if possible;
discarding the bases when the C.S.C.O. operation cannot fix the degenerating issue and there is no Hermitian operator for the bases; and
also confirming whether the common bases are corresponding to the bases of local quantum system to determine if there is any insider quantum attack; and
an abnormal-variation detection unit which reports the abnormal variation detected in the quantum system of a communication environment to the third sub-system, and works with the angular-momentum complementary-observable measurement unit and the incompatible-observable verification unit to determine whether there is suspicious quantum behavior.

11. The quantum-attack resistant operating system for use in a key management mechanism according to claim 2, 3, or 4, in order to avoid false-positive detections and false-negative detections, and to assure the effect of bypassing a quantum computing attack, and to identify normal and abnormal wave-function collapses, and to detect a local decay caused by external interferences, and to assure the accuracy of detection to transition probability, and to assure the accuracy for the subroutines in a Noether-theorem-transform process, wherein the angular-momentum accuracy verification module of the third sub-system comprises:
a non-perturbed wave-function computing unit which performs a non-perturbed wave-function computing process to make use of the common eigen function of non-perturbed Hamiltonian, square of total angular momentum operator $J^2$, square of orbital angular momentum operator $L^2$, and square of spin angular momentum operator $S^2$ as a non-perturbed wave function to derive a first-order energy level shift, wherein the non-perturbed wave-function computing process comprises the following steps:
deriving the expectation value of L and S;
deriving the energy level shift expression from the expectation value;

deriving the non-perturbed energy level shift based on the energy level shift expression;
deriving each energy level shift based on the energy level shift expression;
deriving the wave functions corresponding to each energy shift;
introducing Thomas precession to the wave functions for correction to the spin-orbit interaction;
performing a verification with first-order Stark effect for confirming the corrected result is feasible; and
confirming that there is no degenerate state and no mass interferences with the corrected wave functions so as to extract the final first-order energy shift; and
an energy-shift verification unit which performs an energy-shift verification process to compare the derived first-order energy level shift with the measured energy level bias to determine whether the accuracy of an estimated angular momentum is applicable, wherein the energy-shift verification process comprises the following steps:
confirming the energy level shift is cause by a Stark effect or by Lamb shift;
deriving the angular frequency based on the measured energy level shift which is caused by the Stark effect;
deriving the angular momentum based on the angular frequency;
expressing the first-order energy level shift as a physical quantity through a Hamiltonian operator;
expressing the angular momentum with an observable operator;
performing a verification with Hermitian operator on the physical quantity;
calculating the bias between the physical quantity and the observable; and
tagging the result for further verifications when the derived bias is not acceptable.

12. The quantum-attack resistant operating system for use in a key management mechanism according to claim 8, in order to reduce the verification bias so as to enhance the management ability to the refractive index of an optical path and to be able to identify whether there is a quantum tunneling effect, wherein the energy-shift verification unit further comprises:
a degenerate energy level analysis sub-unit which performs an analysis process to determine whether the current energy level shift fits a degenerate state via analyzing the states of spin quantum numbers, wherein the analysis process comprises the following steps:
analyzing the energy level shift to obtain the quantum number of total angular momentum J;
obtaining measurements of $J^2$;
analyzing the energy level shift to obtain the spin magnetic quantum number $m_s$;
performing Bose-Einstein (B-E) statistics for discarding bosons; and
performing a verification on the obtained quantum numbers with Pauli exclusion principle for determining whether there is degenerate state with the energy shift;
a mass-interference analysis sub-unit which analyzes mass resolution to determine whether there is mass interference with the current energy level shift; and
a Lamb-shift testing sub-unit which adopts a testing process with Lamb-shift calculation for analyzing energy level shift when the measured result of an energy level shift fits the condition of a degenerate state or a mass interference, in addition, this sub-unit can be applied for the measurement of Hawking radiation and quantum fluctuation, or for the identification of quantum tunneling effect, wherein the testing process comprises the following subroutines:
confirming that the splitting of the spectral lines corresponding to the energy level shift fits a fine structure;
introducing the kinetic energy relativistic correction term and the spin-orbit coupling correction term for correcting the non-perturbed Hamiltonian;
introducing the fine-structure constant α;
performing harmonic oscillator quantization for the electric field and magnetic field;
obtaining the zero-point energy from zero oscillation;
converting the zero-point energy to the form of Lamb shift;
measuring the Lamb shift via making use of Zeeman effect;
analyzing whether the measurement fits normal Zeeman effect for confirming whether there is degenerate state with the energy level shift; and
analyzing whether the measurement fits anomalous Zeeman effect via making use of total angular momentum J, orbital angular momentum L, spin angular momentum S, and the Landé g-factor, for confirming whether there is a decay caused by mass interference with the energy level shift.

13. The quantum-attack resistant operating system for use in a key management mechanism according to claim 11, in order to reduce the verification bias so as to enhance the management ability to the refractive index of an optical path and to be able to identify whether there is a quantum tunneling effect, wherein the energy-shift verification unit further comprises:
a degenerate energy level analysis sub-unit which performs an analysis process to determine whether the current energy level shift fits a degenerate state via analyzing the states of spin quantum numbers, wherein the analysis process comprises the following steps:
analyzing the energy level shift to obtain the quantum number of total angular momentum J;
obtaining measurements of $J^2$;
analyzing the energy level shift to obtain the spin magnetic quantum number $m_s$;
performing Bose-Einstein (B-E) statistics for discarding bosons; and
performing a verification on the obtained quantum numbers with Pauli exclusion principle for determining whether there is degenerate state with the energy shift;
a mass-interference analysis sub-unit which analyzes mass resolution to determine whether there is mass interference with the current energy level shift; and
a Lamb-shift testing sub-unit which adopts a testing process with Lamb-shift calculation for analyzing energy level shift when the measured result of an energy level shift fits the condition of a degenerate state or a mass interference, in addition, this sub-unit can be applied for the measurement of Hawking radiation and quantum fluctuation, or for the identification of quantum tunneling effect, wherein the testing process comprises the following subroutines:
confirming that the splitting of the spectral lines corresponding to the energy level shift fits a fine structure;

introducing the kinetic energy relativistic correction term and the spin-orbit coupling correction term for correcting the non-perturbed Hamiltonian;

introducing the fine-structure constant $\alpha$;

performing harmonic oscillator quantization for the electric field and magnetic field;

obtaining the zero-point energy from zero oscillation;

converting the zero-point energy to the form of Lamb shift;

measuring the Lamb shift via making use of Zeeman effect;

analyzing whether the measurement fits normal Zeeman effect for confirming whether there is degenerate state with the energy level shift; and analyzing whether the measurement fits anomalous Zeeman effect via making use of total angular momentum J, orbital angular momentum L, spin angular momentum S, and the Landé g-factor, for confirming whether there is a decay caused by mass interference with the energy level shift.

14. The quantum-attack resistant operating system for use in a key management mechanism according to claim 4, in order to enhance the ability of a counterattack to the quantum computing attacks, the third sub-system further comprises:

a replay-attack response module which performs a replay-attack-response process for responding to a replay attack launched by an attacker side, wherein the replay-attack-response process comprises the following subroutines:

replying to the attacker side with forgery data;

adjusting the optical paths;

working with the perturbation inducing module for bypassing the attack;

working with the honeypot construction module for collecting data of attacks;

working with a second sub-system to perform quantum key clearing; and requesting the third sub-system to perform quantum key recycling;

a quantum random number generator module for deriving a forgery hash value or a message digest;

a preimage attacking module for adopting a forgery hash value with true message digest to launch preimage attack against the attacker side;

a second-preimage attacking module for hiding the true hash function and modifying the length of a true message digest to launch second-preimage attack against the attacker side; and a collision attacking module which performs a collision-attacking process to make use of the inverse function of the true hash function as the hash function, and the inverse element of the true message digest as the message digest, so as to launch a multi-collision attack against the attacker side, wherein the collision-attacking process comprises the following subroutines:

coupling the honeypot construction module for performing collision attacks;

driving collisions for cracking the wave functions, quantum keys, or hash functions, of other quantum systems;

capturing the common message digests between each other;

creating a rainbow table via making use of the hash functions collected from other quantum systems;

storing the quantum keys collected from other quantum systems into a database of patterns;

storing the wave functions collected from other quantum systems into a database of patterns;

making use of no-cloning theorem to extract the linear patterns of the quantum states collected from other quantum systems; and searching for the mothership of an attacker group according to the collected linear patterns.

15. The quantum-attack resistant operating system for use in a key management mechanism according to claim 4, in order to work with the wave-function management module and the system wave-function analysis module of the first sub-system and the spin-property verification module, so as to enhance the ability of a counterattack to the quantum computing attacks, the third sub-system performs an attacking pre-processing program and further comprises a set of modules, wherein the attacking pre-processing program comprises the following subroutines:

generating required quantum states;

making use of quantum Zeno effect to keep the generated quantum states from decohering;

discarding the entangled quantum states;

discarding the quantum states of local quantum system;

preventing from reuse of the same quantum state in a specified time interval;

discarding the quantum states with wrong dimensions; and discarding the quantum states generated with bases of other quantum systems;

and the set of modules comprises:

a forgery-key attacking module for delivering a forgery public key to the attacker side;

a forgery-quantum-state attacking module coupled to a set of components for producing a large number of forgery quantum states via making use of incorrect combinations of spin properties, wherein the set of components comprises:

the angular momentum coupling unit of the first sub-system;

the spin-orbit coupling unit of the first sub-system;

the heavy-atom effect activation unit of the first sub-system;

the coupling constant derivation unit of the first sub-system;

the spin-property verification module of the third sub-system;

the incompatible-observable verification unit of the third sub-system; and the angular-momentum accuracy verification module of the third sub-system; and a quantum DoS attacking module for making a large number of quantum states be decohered in other quantum systems via controlling the temperature of other quantum systems.

16. The quantum-attack resistant operating system for use in key management mechanism according to claim 10, in order to perform a counterattack according to an abnormal signal, to bypass an attack according to an abnormal signal, to block an attack according to an abnormal signal, to collect data of attacks with honeypots, to perform quantum key clearing or quantum key recycling for an abnormal event, to verify a result of quantum key storage for an abnormal event, or to perform a service migration for an abnormal event, wherein the abnormal-variation detection unit of the quantum-computing-attack detection module comprises:

an abnormal-decoherence detection sub-unit which determines whether the sub-unit should report an abnormal signal to the third sub-system according to the rate of decoherence detected in the quantum communication environment;

a wave-function-collapse detection sub-unit coupled to a set of components for monitoring wave functions in a quantum communication environment, and reporting an abnormal signal to the third sub-system when the phenomenon of wave-function collapse is detected, wherein the set of components comprises:
  the system wave-function analysis module of the first sub-system;
  the fundamental-unit analysis module of the second sub-system;
  the probability-of-excited-state analysis unit of the third sub-system;
  the Pauli-vector analysis unit of the third sub-system;
  the harmonic-oscillator analysis unit of the third sub-system;
  the degenerate energy level analysis sub-unit of the third sub-system; and
  the Lamb-shift testing sub-unit of the third sub-system;

an abnormal-transition-effect detection sub-unit which compares the distribution of transition-effect probability detected in the quantum communication environment with the distribution of transition-effect probability estimated through the detected wave functions, and determines whether the sub-unit should report an abnormal signal to the third sub-system according to the comparison bias;

an abnormal-variable detection sub-unit which introduces an analyzing process of the Einstein-Podolsky-Rosen paradox, and reports an abnormal signal to the third sub-system when a quantum physical behavior consisting with local realism and uncertainty principle simultaneously is detected, wherein the analyzing process comprises the following steps:
  introducing a Bell measurement to find a case which fails the Bell measurement;
  confirming the distribution of transition probability is reasonable for the case that failed the Bell measurement;
  discarding the case if it fits the Aharonov-Bohm effect;
  discarding the case if it fits the Bohm diffusion; and
  reporting an abnormal signal to the third sub-system if there is still a case after the above steps; and an abnormal-entropy-variation detection sub-unit which performs a variation analyzing process to determine whether the sub-unit should report an abnormal signal to the third sub-system according to the variation of entropy detected in a quantum system connected to a communication environment, wherein the variation analyzing process supports kinds of entropy as follows: von Neumann entropy, Shannon entropy, equilibrium entropy, and maximum entropy;

in addition, the variation analyzing process further comprises the following steps:
  making use of Boltzmann's entropy formula with transition probability, entropy, and Boltzmann constant for estimating the variation of entropy;
  discarding the case if the variation of entropy fits the principle of the increase of entropy;
  performing a verification with Holevo's theorem for confirming the analyzed variation is out of Holevo's bound; and
  introducing Lindblad's theorem for confirming that the analyzed variation is not caused by a non-equilibrium so that this sub-unit should report an abnormal signal to the third sub-system.

* * * * *